United States Patent
Bernhardt

(10) Patent No.: US 9,936,709 B2
(45) Date of Patent: Apr. 10, 2018

(54) DOUGH PROCESSING SYSTEM AND METHOD THEREFOR

(75) Inventor: Udo Bernhardt, Iphofen (DE)

(73) Assignee: Fritsch GmbH, Markt Einersheim (DE)

( * ) Notice: Subject to any disclaimer, the term of this patent is extended or adjusted under 35 U.S.C. 154(b) by 921 days.

(21) Appl. No.: 13/825,205

(22) PCT Filed: Sep. 23, 2011

(86) PCT No.: PCT/EP2011/066572
§ 371 (c)(1),
(2), (4) Date: May 3, 2013

(87) PCT Pub. No.: WO2012/038527
PCT Pub. Date: Mar. 29, 2012

(65) Prior Publication Data
US 2013/0216672 A1    Aug. 22, 2013

(30) Foreign Application Priority Data
Sep. 24, 2010    (DE) .......................... 10 2010 037 761

(51) Int. Cl.
*A21C 3/08*    (2006.01)

(52) U.S. Cl.
CPC ..................................... *A21C 3/08* (2013.01)

(58) Field of Classification Search
CPC .. A21C 3/08; A21C 3/06; A21C 3/065; A21C 3/10
See application file for complete search history.

(56) References Cited

U.S. PATENT DOCUMENTS

2007/0048423 A1*    3/2007    Bernhardt ................ A21C 3/08
426/499

FOREIGN PATENT DOCUMENTS

| DE | 101 46 799 A1 | 4/2003 |
|----|---------------|--------|
| WO | 95 08921 A1 | 4/1995 |
| WO | 98 20741 A1 | 5/1998 |
| WO | 10 60164 A1 | 8/2001 |

* cited by examiner

*Primary Examiner* — Steven Leff
(74) *Attorney, Agent, or Firm* — Frank H. Foster; Kremblas & Foster

(57) ABSTRACT

A dough processing system for processing a U-shaped strand of dough comprising a processing head, which has two gripping means for looping the dough strand, and a shaping table, which is provided with positioning means for positioning the dough strand, wherein the shaping table is embodied as a processing table, in which various positioning means of the processing table have multiple different processing functions.

2 Claims, 32 Drawing Sheets

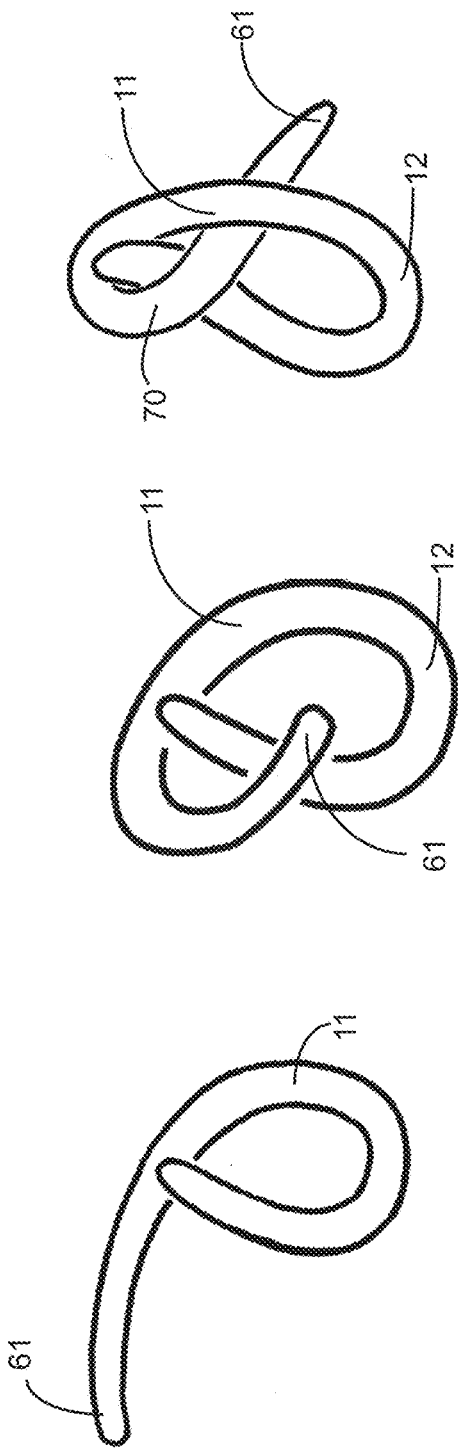
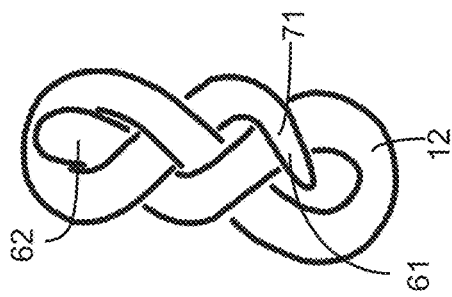
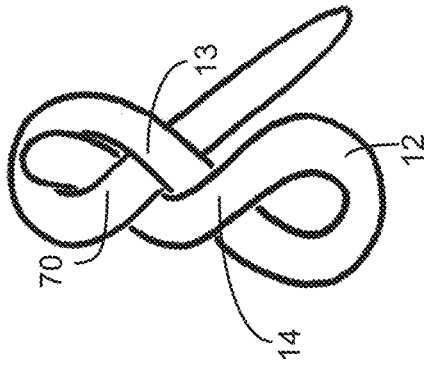
Fig. 3a  Fig. 3b  Fig. 3c  Fig. 3d  Fig. 3e

DOUGH PROCESSING SYSTEM AND METHOD THEREFOR

The invention relates to a dough processing system for processing a U-shaped strand of dough, comprising a dough processing head, which has two gripping means for looping the dough strand, and a shaping table, which is provided with positioning means for positioning the dough strand. The invention also relates to a method for producing a single-strand braid.

BACKGROUND OF THE INVENTION

Dough processing systems of the above-stated type are known for use in the automated production of pretzels. One such system is illustrated and described, for example, in WO 01/60164. This system consists of two main components. The first component is a dough processing head, which is equipped with two program-controlled grippers. The second component is a holding element, which is integrated into the shaping table and comprises a plurality of positioning means embodied as holding pins. The holding pins hold the strand of dough on the shaping table during a looping movement in the production of the pretzel shape.

The problem addressed by the invention is that of devising a dough processing system with which the fully automatic production of a different dough shape is possible, more particularly, with which the production of a so-called single-strand braid is possible

SUMMARY OF THE INVENTION

This problem is solved by a system having the characterizing features of claim 1, in conjunction with the features in the preamble thereof, and/or by the features of the independent claims.

Because the processing elements are integrated into the table, said elements, in conjunction with the gripper arms of the head, are capable of forming the loops and shapes characteristic of a braid.

In principle, the invention can also be used to create other dough shapes.

The invention also relates to a method for processing a strand of dough comprising a U-shaped, curved dough strand, in which a single-strand braid is formed by means of a processing head, which comprises two gripping means, and a processing table having different processing functions. The method according to the invention enables the fully automatic production of a single-strand braid in large numbers of units.

Additional advantageous embodiments of the invention are specified in the dependent claims.

In one advantageous further development of the system according to the invention, it is provided that at least one positioning means is implemented as a lifting means for lifting a section of a dough strand to a raised position, such that sections of the dough strand are raised relative to the shaping table. This allows one end of the dough strand to be passed through below a section of the strand to allow a braided shape to be formed.

At least one positioning means is expediently embodied as a gripping means for pulling on one end of the dough strand, thereby allowing sections of the dough strand to be stretched and/or pulled. This pulling is advantageous, because it makes a third gripper available, so that, without assistance from the tool head, a type of knot can be produced which is essential to the formation of a single-strand braid.

At least one positioning means is advantageously embodied as a pivoting means for pivoting a dough strand loop, formed by the gripping means of the processing head, about an axis of rotation that extends parallel to the plane of the processing table. Said means allows a loop to be rotated 180°, which is also essential to the formation of a single-strand braid.

To produce a single-strand braid, it is therefore advantageous for at least one lifting means, one gripping means, and one pivoting means to be provided on the processing table.

In a further advantageous embodiment of the invention, the pivoting means has two retaining arms, spaced from one another, which are oriented transversely to a direction of conveyance on the processing table and which each support, at one of their ends, a particularly L-shaped retaining tongue, wherein the two retaining arms are rotatable about a parallel axis of rotation which is spaced from the retaining arms, and wherein the retaining arms are secured at the ends thereof opposite the retaining tongues to a mount, which is capable of tilting about an axis aligned in the direction of conveyance of the processing table, resulting in a forward and backward movement of the retaining arms and/or the retaining tongues. The retaining arms are capable of producing the characteristic loop of the single-strand braid, wherein between the arms, the braid end can be positioned in the loop by a gripper of the head.

One particularly preferred development of the invention is characterized in that a preferably U-shaped positioning means is provided on the processing table for securing one end of a dough strand during dough processing, wherein said positioning means is configured as retractable into the processing table. This allows the dough strand to be held lightly on the table at the start of dough shaping, allowing the same shape to be produced consistently, even in large numbers of units.

To maintain the shape of a loop, it is advantageous for at least one positioning means on the table to be embodied as a retaining pin which is capable of retracting into the processing table. Said pin forms the counterpart to a rotary actuator, which will be described further below.

Another preferred development of the invention is characterized in that the processing table is equipped with multiple conveyor belts arranged side by side, wherein at least some of the positioning means are arranged between the conveyor belts. The processing elements can be situated between the individual belts.

The method according to the invention is particularly advantageous if it comprises the following steps:
- a dough strand infeed step, in which the U-shaped strand of dough is supplied to the processing table,
- a processing step, in which an approximately pretzel-like basic form comprising a first loop and a second loop is formed from the U-shaped strand of dough through a crossover movement of the dough, in which the dough strand is not yet looped and/or is not yet knotted at the crossover point,
- a first securing step, in which one end of the dough strand is secured on the processing table and/or on the dough strand in the area of the first loop,
- a second securing step, in which the strand section is secured on the processing is table in the area of the second loop, which is opposite the end,
- a lifting step, in which the strand section in the area of the second loop is raised,
- a gripping step, in which another end of the dough is gripped by a gripping means arranged on the processing table and is pulled through between the processing table and an area of the strand section, another gripping step, in which the other end is gripped by a gripping means arranged on the processing head, a pivoting step, in which the second loop is pivoted approximately 180° around an axis, which is arranged transversely to the direction of conveyance along the processing table, to the raised position, in which the dough then crosses over itself at two points, a dough movement step, in which the second loop is placed back on the processing table, and another dough movement step, in which the end of the dough is placed in the second loop and/or is pushed through the loop opening.

These steps allow rapid and precise shaping.

It is expedient for the processing step, in which the pretzel-like basic form is created, to be implemented using gripping means on the processing head, for the first securing step to be implemented by means of a preferably U-shaped positioning means, for the second securing step to be implemented using a holding pin, for the lifting step to be implemented using at least one lifting means, preferably a linearly guided lifting element and/or using retaining arms, for the pivoting step to be implemented using two retaining arms, for the dough movement step to be implemented by tilting the retaining arms in the direction of the processing table, and for the further dough movement step to be implemented using a gripping means arranged on the processing head.

One embodiment example will be specified in greater detail in reference to the set of drawings, wherein advantageous developments of the invention and advantages thereof are described.

BRIEF DESCRIPTION OF THE DRAWINGS

The drawings show:

FIGS. 3*a* through 3*e* are front views showing in step by step sequence a known, manual production of a single-strand braid, FIG. 4 a tool head of the system in a view from below, FIG. 5 a perspective illustration of the system with a U-shaped strand of dough, FIG. 6 an enlarged, perspective illustration of a shaping and/or looping table, FIG. 7 an illustration of the system without the dough strand, in a position in which a strand can be pulled through and then gripped again, FIG. 8 a perspective illustration of the system in a first placement position, FIG. 9 an illustration of the system in a normal position from a first perspective, FIG. 10 a perspective illustration of the normal position from a second perspective, FIG. 11 a perspective illustration of the system, in which two grippers grip the U-shaped dough strand, FIG. 12 a perspective illustration of the system, in which the dough is shaped by the grippers, FIG. 13 a perspective illustration of the system, in which the dough is crossed over slightly by the grippers, FIG. 14 a perspective illustration of the system, in which the dough is crossed over fully by the grippers, FIG. 15 a perspective illustration of the system, in which the dough has approximately a pretzel-like initial shape, FIG. 16 a perspective illustration of the system, in which sections of the dough are raised, FIG. 17 an illustration of the system, in which the dough is still raised, but viewed from the second perspective, FIG. 18 a perspective illustration of a pulling process from the second perspective, FIG. 19 a perspective illustration of a gripping process of an upper gripper, FIG. 20-22 perspective illustrations showing how the dough is rotated, FIG. 23-28 perspective illustrations showing how one end of the dough is placed in a loop, FIG. 29 a perspective illustration in which all the processing elements on the table have been released from the single-strand braid, FIG. 30 a perspective illustration in which the processing elements are moving or have already moved to their normal position, and FIG. 31 a perspective illustration in which the table is back to its normal position.

DETAILED DESCRIPTION

Figure 1:
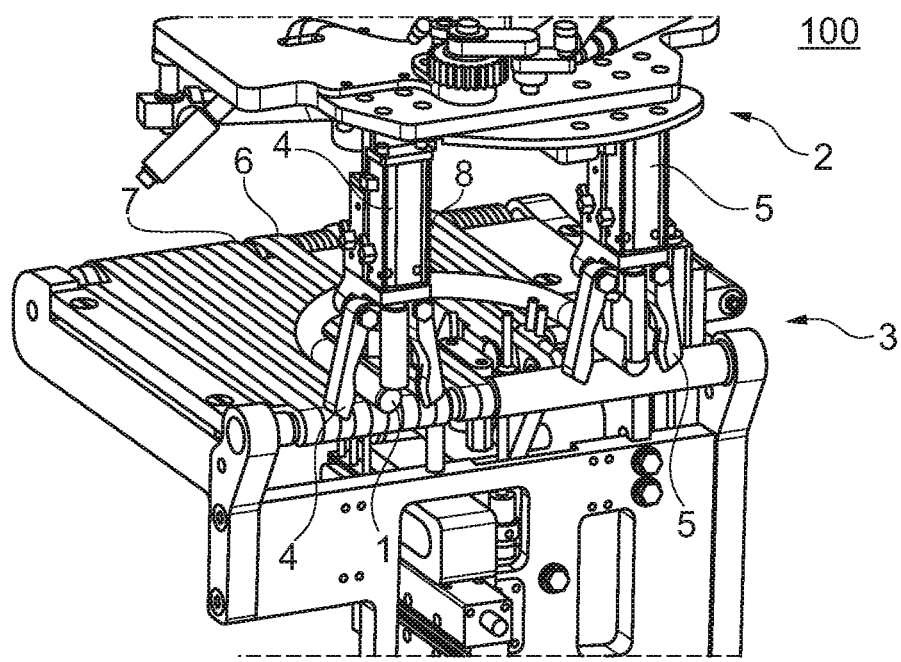
FIG. 1 a perspective illustration of a system according to the invention in a normal position, FIG. 2 a single-strand braid.

FIG. 1 illustrates a looping system or a dough processing system 100 for producing a single-strand braid or for processing a U-shaped strand of dough 1. An existing infeed device for bending the U-shaped dough strand is already sufficiently known and will not be specified in greater detail here. A delivery table can also be situated downstream of said system a known manner, which will advance the dough products further. The system 100 consists essentially of two main components, specifically a processing head 2 and a shaping table, embodied as processing table 3. The processing head 2 has two generally known gripping means or grippers 4, 5 for looping the dough strand. The grippers 4, 5 are known from WO 01/60164, for example. The processing table 3 has a plurality of conveyor belts arranged side by side, comprising narrow conveyor belts 6 and wide conveyor belts 7, 8. Between the individual conveyor belts, various types of positioning means are arranged, each of which moves the dough strand 1 to a specific position, so that overall the single-strand braid results. Holding pins, along with other elements that do more than simply "hold" are used for this purpose. These elements integrated into the processing table 3 will be specified in greater detail below. These elements have a processing function which is at least partially comparable with a processing function of the grippers 4, 5.

Figure 2:
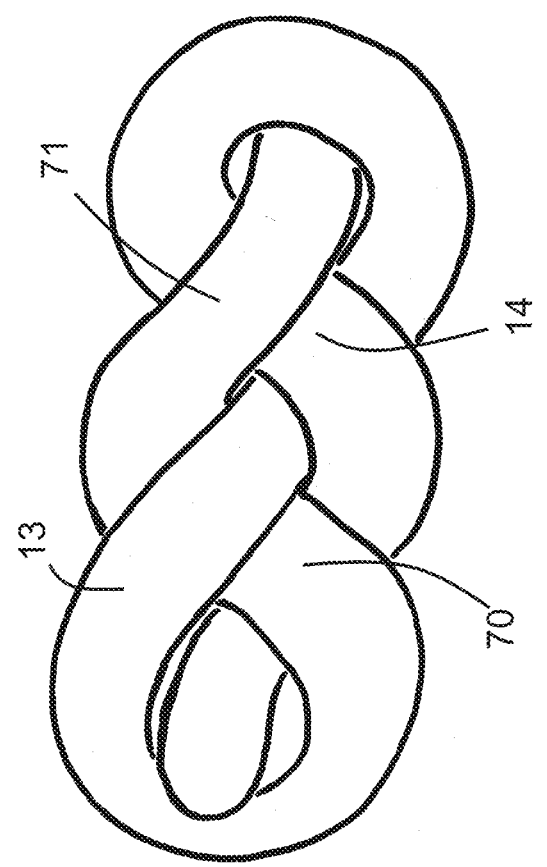

The manual production of a single-strand braid has long been known. FIG. 2 shows such a single-strand braid, which can be produced manually and, using the invention, automatically. The braid has four characteristic crossover points 13, 14, 70 and 71. FIGS. 3*a*-3*e* illustrate the manual production steps. As will later become clear, mechanized production differs slightly from manual production; this applies particularly to the initial position shown in FIG. 3*a*. However, characteristic of the single-strand braid is that one end of the dough strand 61 is guided beneath a strand section 11, as shown in FIG. 3*c*. Also characteristic is the rotation or pivoting or turning of a loop 12 to create a shape illustrated in FIG. 3*d*. These two measures result essentially in the two crossover points 13 and 14, which are identified FIG. 3*d*. In the final step, the end of the strand of dough 61 is guided through the loop 12, as shown in FIG. 3*e*.

Above the processing table 3 the processing head 2 is located, which is effectively part of a known looping device (cf. WO 01/60164) which executes the desired movement steps as sequential steps by programming a suitable program for an MPC (memory programmable control) that controls the looping device or a freely programmable control system.

Figure 4:
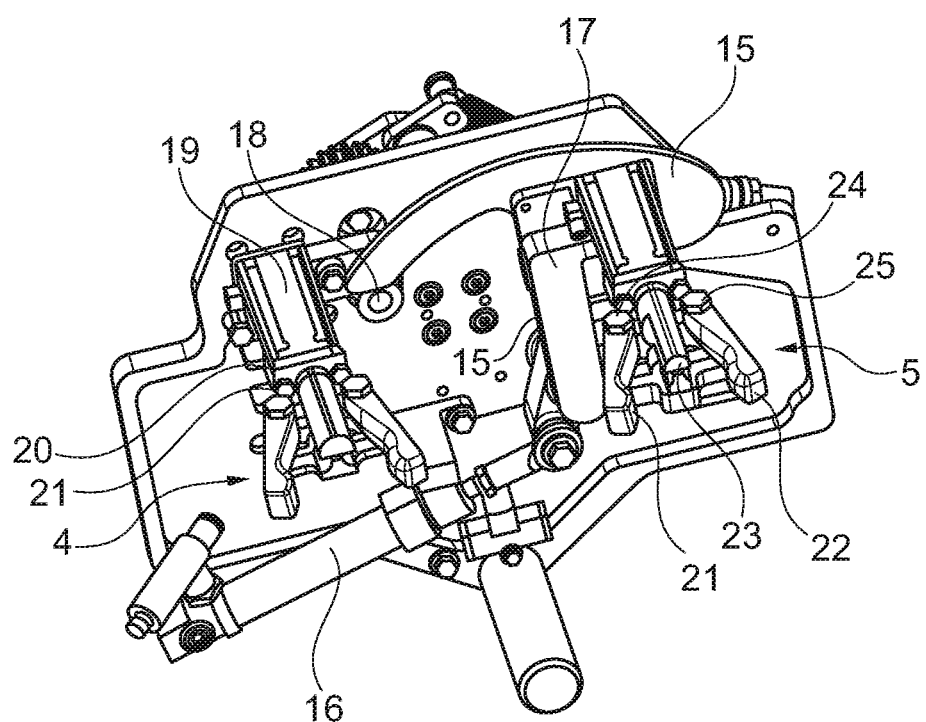

As is clear from FIG. 4, the processing head 2 consists essentially of a horizonta guide 15 having at least one lift cylinder 16, which guides the two grippers 4, 5 horizontally. The horizontal guide 15 comprises a plurality of guide elements 17, 18, connected in an articulated manner. The processing head 2 further comprises a vertical guide 19 for each gripper 4, 5, with at least one positioning cylinder and a rotary actuator with a rotary guide and a rotating head 20. By means of a retaining part, the vertical guide 19 can be moved horizontally, together with the cylinders, the rotary actuator, and the rotating head 20, via the horizontal drive and the lift cylinders. The rotating head 20 can be displaced vertically via the lift cylinder and a linear guide. By means of the rotary actuator, the rotating head 20 can be rotated 360° about a vertical axis. The rotating head 20 can also be pivoted about vertica axes.

As is also clear from FIG. 4, each gripper 4, 5 consists of two gripping fingers 21, 22, which can be brought together and spread apart, or can be pivoted about axes 24, 25, in order to grip or release the strand of dough. Between the grippers, a sliding element 23 (stripper) is provided, which can be displaced vertically and is provided for moving the dough away from the grippers when the gripping fingers 21, 22 are open or for gripping a mass of dough. This is expedient since otherwise the dough could remain stuck to the gripping fingers 21, 22.

Figure 5:
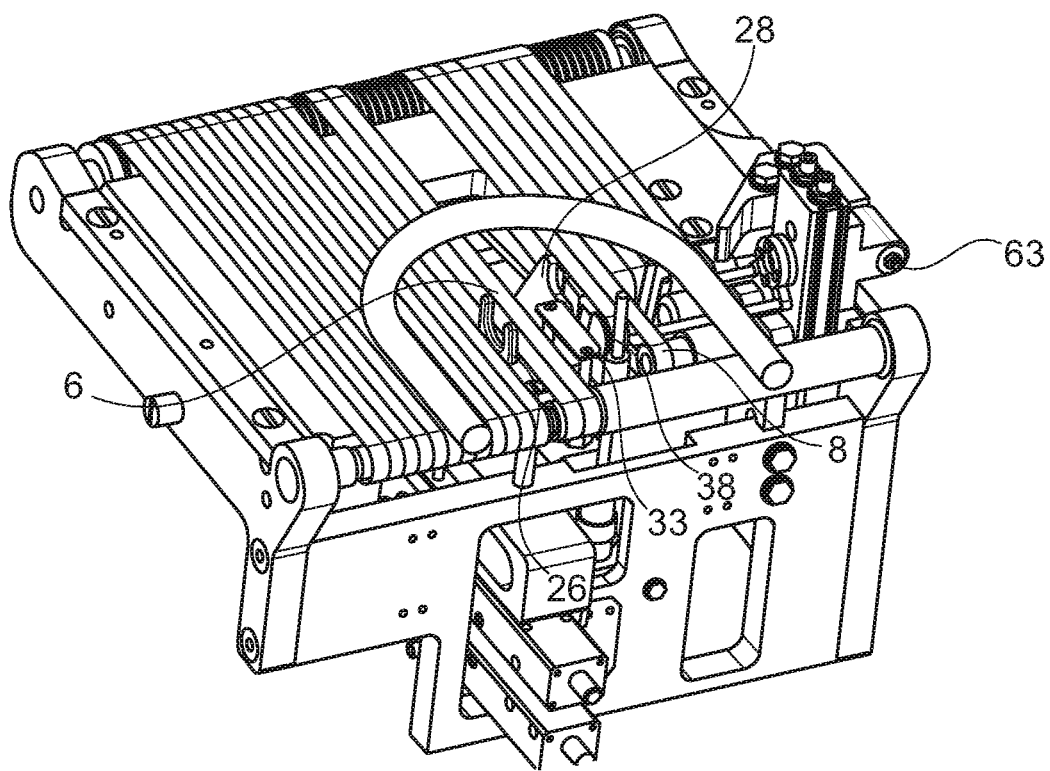
Figure 6:
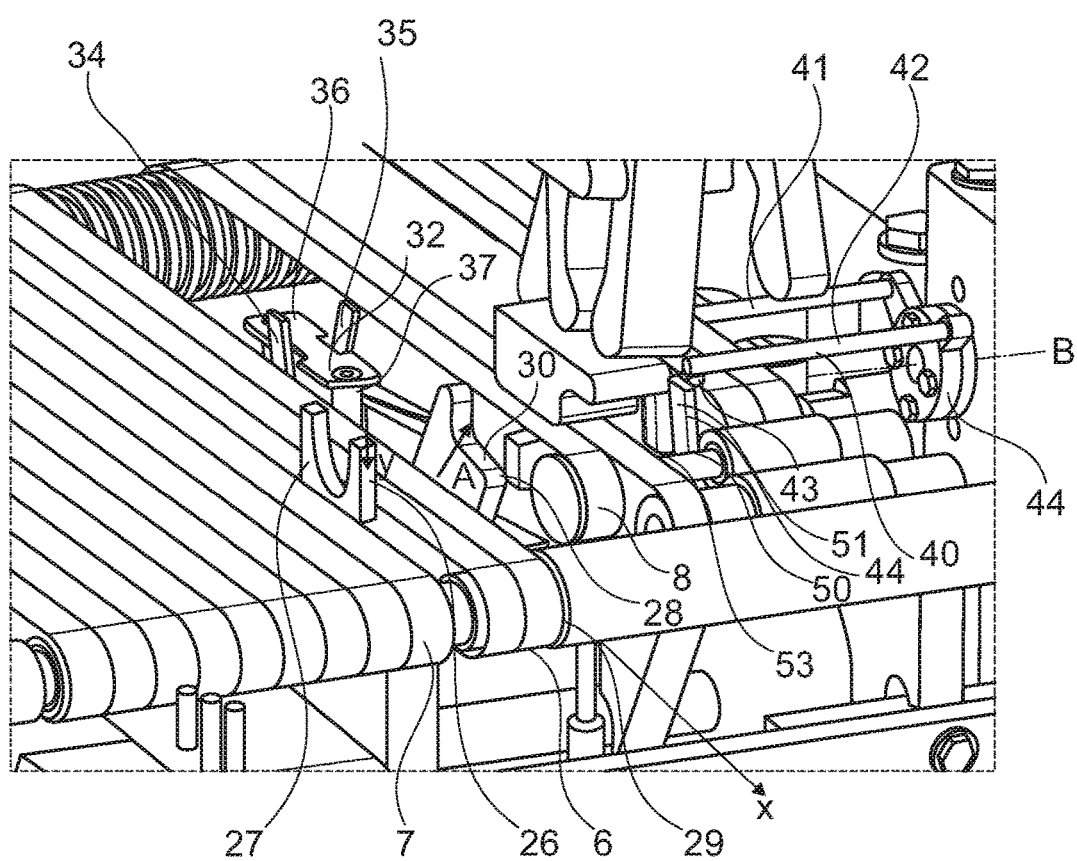

FIG. 5 shows the processing table 3, also called a looping table, wherein FIG. 6 shows the looping and/or processing components in an enlarged illustration.

The conveyor table or processing table 3 comprises a U-shaped positioning means 26, as illustrated by FIGS. 5 and 6, which is a vertically arranged retaining tongue 27 with a U-shaped cut-out at its unattached end, wherein the tongue 27 extends parallel to the direction of transport X along the processing table. This positioning means 26 serves to hold a loop during processing of the dough and is made of plastic, for example. The end of the dough strand 62 is placed through the U-shaped cut-out 26, the width of which is adapted to the diameter of the dough strand. The retaining tongue 27 is capable of retracting into the table 3. The arrow Y indicates the direction in which positioning means 26 or retaining tongue 27 retracts. FIGS. 5 and 6 show the retaining tongue 27 in the surfaced position. In this surfaced position, the dough rests in the area of said retainer, but still flat on the processing table 3. A retraction of the retaining tongue 27 is necessary in order for the finished looped single-strand braid to be released and advanced further.

However, the positioning means 26 has another function, specifically that of holding the U-shaped strand of dough 1 directly after the U-shaped dough strand 1 has reached the processing table 3 and/or has stopped there for further processing. The retaining tongue 27 has a function comparable to that of the holding pins integrated into the table in WO 01/60164. It holds the dough in position. The retaining tongue 27 supports shaping as the dough is being looped. As is also clear from FIG. 6, the retaining tongue 27 rests in a gap between conveyor belts 6 and 7, wherein the conveyor belts are spaced from one another. Alternatively, the retaining tongue 27 could be replaced by two pins, which would be placed in the area of the legs. However, the tongue solution has the advantage that the dough can be positioned there offset slightly upward.

Between the two conveyor belts 6 and the third conveyor belt 8 or this belt arrangement or belt group is a lifting means 28, which is illustrated in FIG. 6, for example. The lifting means 28 positions the dough strand in a position spaced from the table 3, and therefore is also a positioning means 28. The lifting means 28 is a holding bar 29, which is embodied as a slider and is capable of retracting into the processing table 3 and can be deployed far enough outward that the dough is raised or pushed upward at least by the height of the dough, allowing one end of the dough strand to be pulled through, as will be illustrated further below. In contrast to the retaining tongue 27, the vertical movement is not by 90° in relation to the plane of the table, and instead extends at a slight angle, deviating, for example, 10°-45° from vertical, as indicated by the arrow A. This angle is expedient for pushing the dough into the correct position when it is raised. The unattached end of the lifting means 28 or the holding bar 29, which is made of plastic, for example, has a curved contour 30, in which the dough is held. As is clearer in FIG. 5, the lifting means 28 is arranged upstream of the U-shaped positioning means 26 (relative to the direction of conveyance).

Also situated between the second conveyor belt 6 and the third conveyor belt 8 is a table gripper 32. Said gripper positions the end of the strand of dough 61 or pulls said end through beneath a dough loop. This gripper is referred to as a gripping means 33 or positioning means 33 (FIG. 5). It can be displaced in the direction of conveyance X, wherein the table gripper 32 is in a forward position in FIG. 5 and is in a rear position in FIG. 6. For gripping an end of the dough strand, the table gripper 32 is equipped with two gripping fingers 34, 35, as shown in FIG. 6, which can be rotated and/or closed and opened around an axis that lies in the direction of conveyance X. Between the gripping fingers 34, 35 is a support plate 36, in which said end of the strand of dough can rest. The support plate 36 is secured by bolt 37 and is connected to a linear guide. The table gripper 32 is arranged between belt 6 and belt 8, as is clear from FIG. 5. The positioning means 33 is therefore embodied as a gripping means for pulling on one end of the dough strand, thereby stretching and/or pulling on sections of the dough strand.

Figure 7:
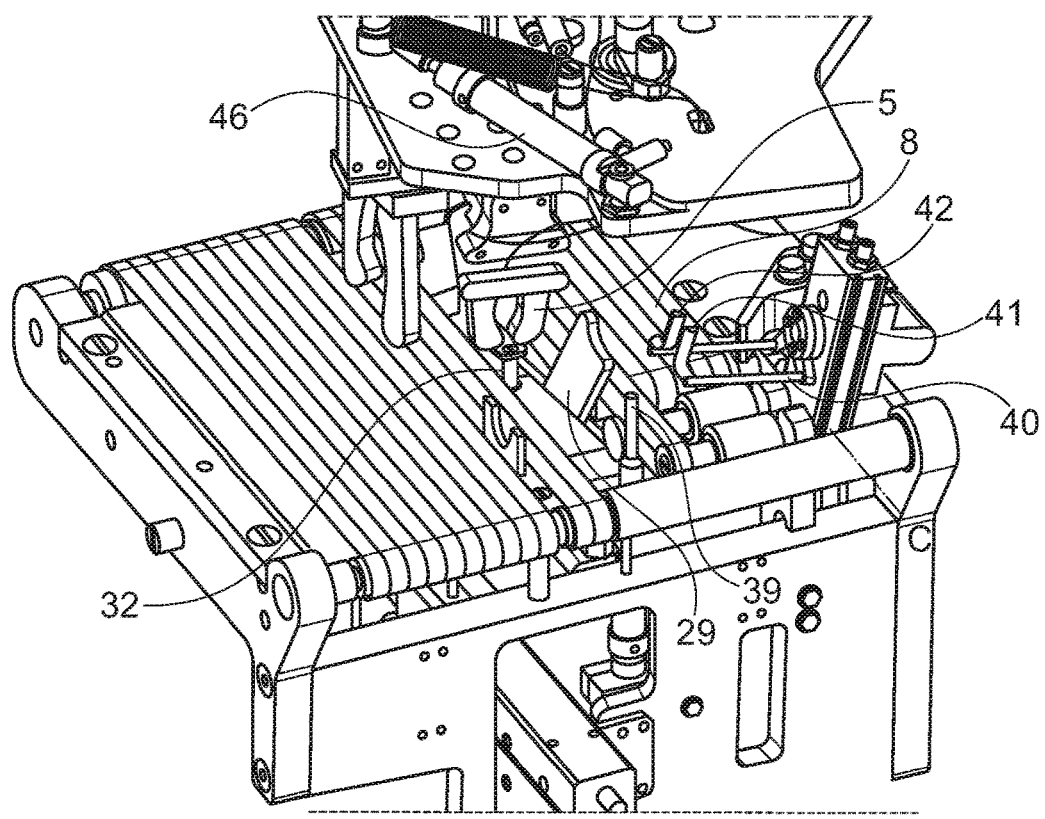

FIG. 7 shows the slider or the holding bar 29 pushed upward, and also shows that the table gripper 32 has been moved toward the rear, wherein in this position, the second gripper 5, which in the normal position (FIG. 1) is situated near the third belt 8, is ready to grip the dough strand 61 again. In contrast, in FIG. 1 the two grippers 4, 5 are ready to grip the U-shaped dough strand.

Between the belt 8 and the table gripper 32 or the holding bar 29, a further positioning means 38 (FIG. 5), specifically a holding pin 39 (FIG. 7), is integrated into the processing table 3, as is clear from FIGS. 5 and 7. The holding pin 39 lies downstream of the retaining tongue 27 and the holding bar 29 (in the direction of conveyance). Holding pin 39 holds a second loop of the dough strand in position, as will be described further below. Furthermore, holding pin 39 is capable of retracting entirely into the processing table 3, so that in the recessed position, in which pin 39 does not project at all out of the table 3, the finished dough product can be advanced further by means of belts 6 to 8, as is already known from WO 01/60164.

It is expedient for multiple holding pins, particularly two pins 39 and 39b, to be integrated into the table, wherein the second pin is not shown in FIGS. 5 to 8, but will be illustrated and specified further below.

Figure 8:
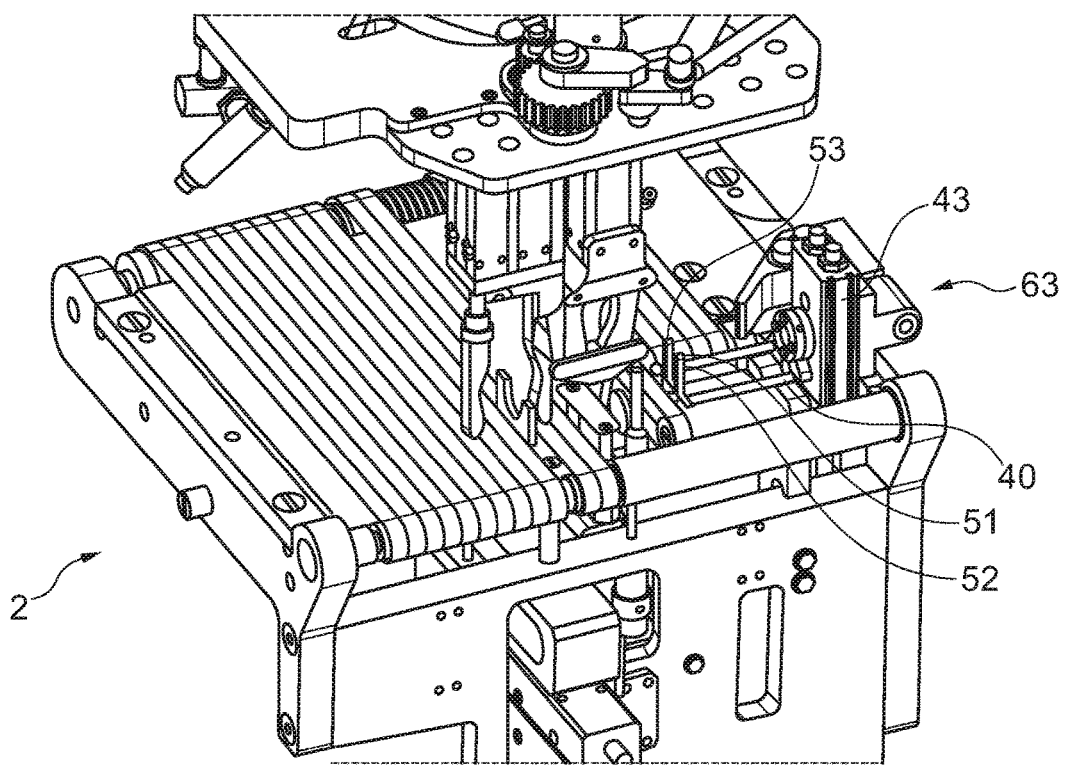

In addition to the first positioning means 26, the second positioning means 28, the third positioning means 33 and the fourth positioning means 38, a fifth positioning means 40 is provided, which is shown in different positions in FIGS. 6, 7 and 8.

Positioning means 40 is used to rotate a dough loop or to pivot a dough strand loop, which has been shaped by gripping means 4, 5 of the processing head 2, about an axis of rotation which extends parallel to the plane of the processing table 3. This axis corresponds approximately to an axis of rotation B, which is shown in FIG. 6.

As is clear from FIGS. 6 to 8, positioning means or pivoting means 40 is embodied as a fork holder with fork arms 50. Pivoting means 40 has two retaining arms 41, 42 spaced from one another. Said arms are aligned transversely to the direction of conveyance X along the processing table 3 and are each equipped at one end with fork arms 50 or with L-shaped retaining tongues 51, 52. In a normal position as illustrated in FIG. 8 (cf. FIG. 6), each retaining tongue 51, 52 has one leg that extends parallel to the table 3 and one vertical leg 53. The two retaining arms 41, 42 are rotatable about the parallel axis of rotation B, which is spaced from the retaining arms.

The retaining arms 41, 42 are further secured to a mount 44 at the opposite ends of the retaining tongues 51, 52. A rotary actuator rotates the arms 41, 42 by 180°, so that the fork arms 50 either point upward, as shown in FIG. 8, or point downward, as shown in FIG. 6. The retaining arms 41, 42 are also spaced from the axis B, so that the two arms 41, 42 and the axis B effectively form a triangle.

Additionally, the arms 41, 42 are capable of tilting around an axis C, which is oriented in the direction of conveyance on the processing table 3, as is clear from a comparison of FIGS. 7 and 8. This results in a forward and backward movement of retaining arms 41, 42 or retaining tongues 51, 52 or fork arms 50. For this purpose, the mount 44 is connected to a tilting element 45 or a rotary actuator 63, which is fastened to the processing table 3. Element 45 comprises a pneumatic cylinder or a rotary cylinder. The goal of the retaining arms 41, 42 is to process the dough such that a dough loop is raised off of the table, effectively turned "in mid-air" and then set back down on the table 3. The tilting movement is achieved by means of a rotary actuator 63 or the tilting element 45.

Positioning or processing the dough involves processes such as securing the dough (cf., e.g., means 26), lifting the dough (cf., means 28), shaping the dough by pulling the dough (cf., means 33), holding or supporting the dough (cf., means 38, 40) or pivoting or rotating the dough (cf., means 40).

In the following figures, the production or shaping of the single-strand dough will be specified in greater detail. FIGS. 9 to 31 illustrate the specific steps involved in processing the strand of dough 1 from the U-shaped, curved dough strand, in which the single-strand braid as shown in FIG. 2 is shaped by means of the processing head 2 comprising two gripping means 4, 5 and the processing table 3, which has various processing functions.

Each of FIGS. 10 to 31 illustrates a position that succeeds the preceding figure.

Figure 9:
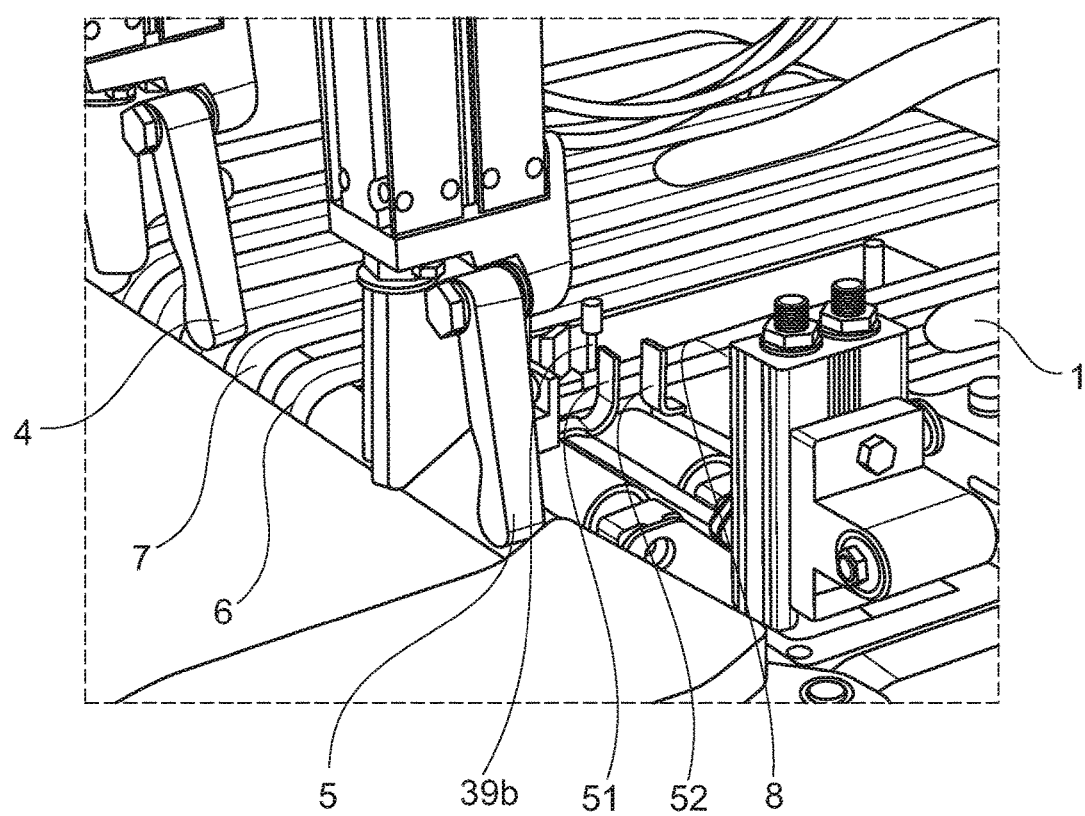

FIG. 9 shows how a U-shaped strand of dough 1 is supplied to the system 100 and is moved by conveyor belts 6 to 8 in the direction of the opened grippers 4, 5 of the head 2. Here, the second holding pin 39*b* and a rear retaining tongue 52 of the fork holder are visible. The second holding pin 39*b* is shown in the forward position. The retaining arms 41, 42 are folded down, with the vertical legs of the retaining tongues 51, 52 pointing upward.

Figure 10:
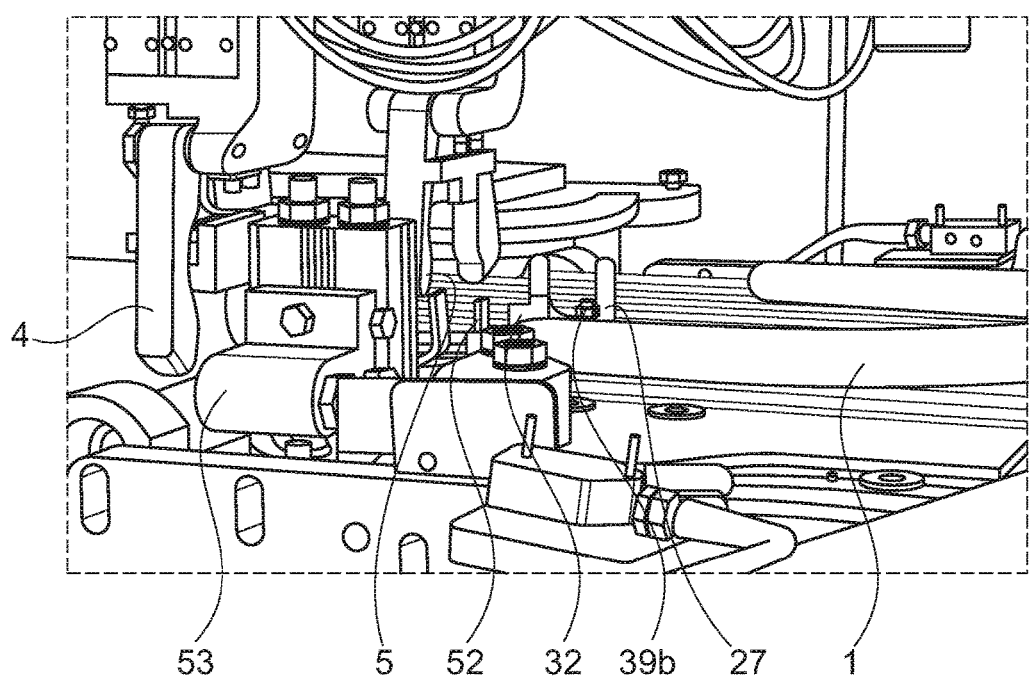
Figure 13:
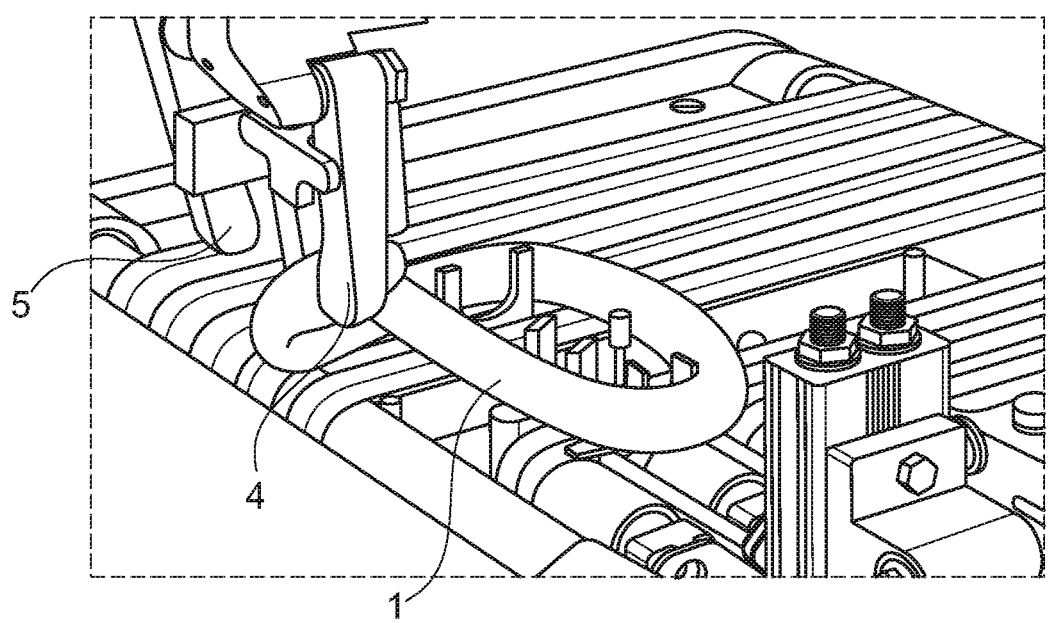

FIG. 10 shows that the strand of dough 1 is moved to the grippers 4, 5 and that the retaining tongue 27 has already been deployed. The function of the retaining tongue 27 is to hold a first loop of the dough strand, as shown in FIG. 13, for example. Also shown is the table gripper 32.

Figure 11:
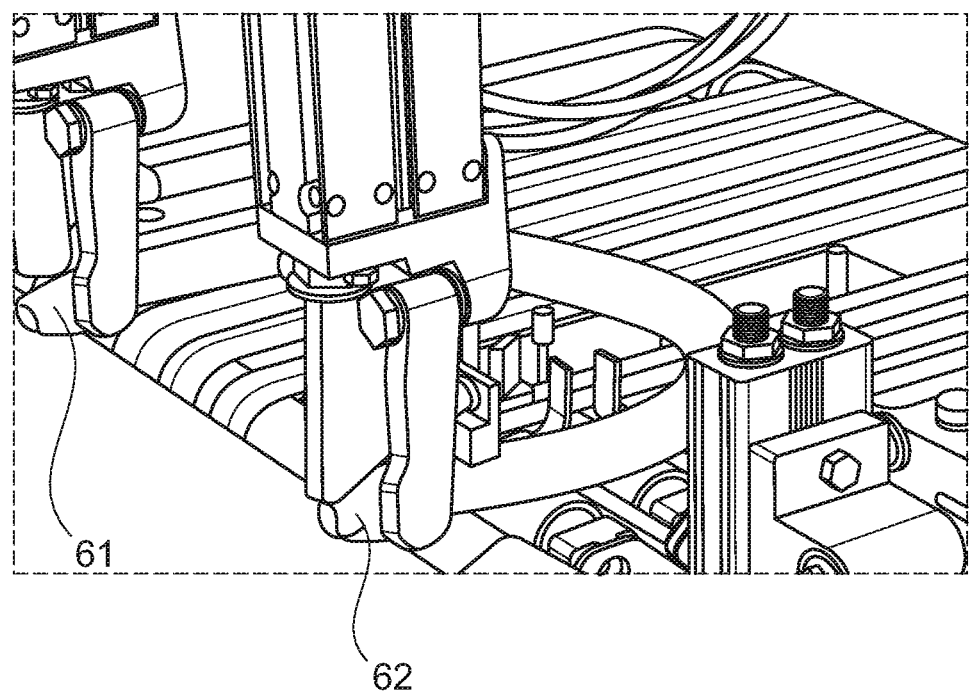
Figure 12:
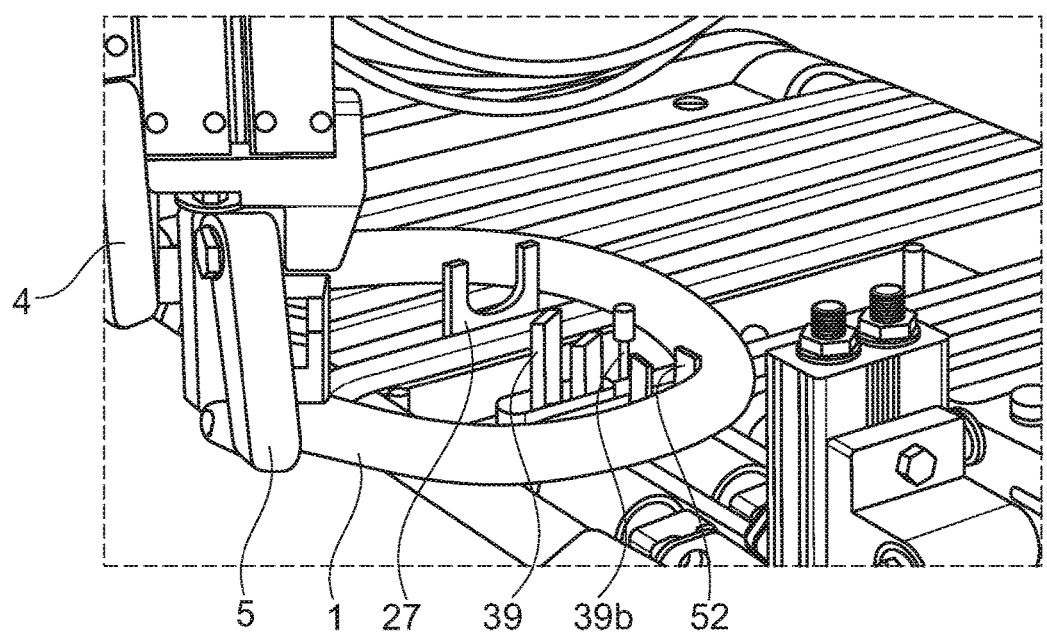

FIG. 11 shows that the grippers 4, 5 grip the ends 61 and 62 of the dough strand 1. From this gripping position, a lifting movement of the grippers 4, 5 upward and a crossover pivoting movement of the grippers 4, 5 are carried out, as is illustrated in FIGS. 12 and 13. The pivoting movement is achieved by means of lift cylinders 16 and 46 (FIG. 4 and FIG. 7), which guide the two grippers 4, 5 horizontally.

FIGS. 12 and 13 clearly show that the dough strand 1 rests against the retaining tongue 27, the second holding pin 39*b*, and the L-shaped retaining tongue 51/52 of the fork holder. In other words, at least some of the processing elements 27, 39*b*, 52 have a positioning function. The first holding pin 39, the function of which is to receive a curved section of dough, is deployed before dough strand 1 fully reaches elements 27, 39*b*, and 52, i.e., shortly before the position shown in FIG. 12 or between the positions shown in FIG. 11 and FIG. 12.

Figure 28:
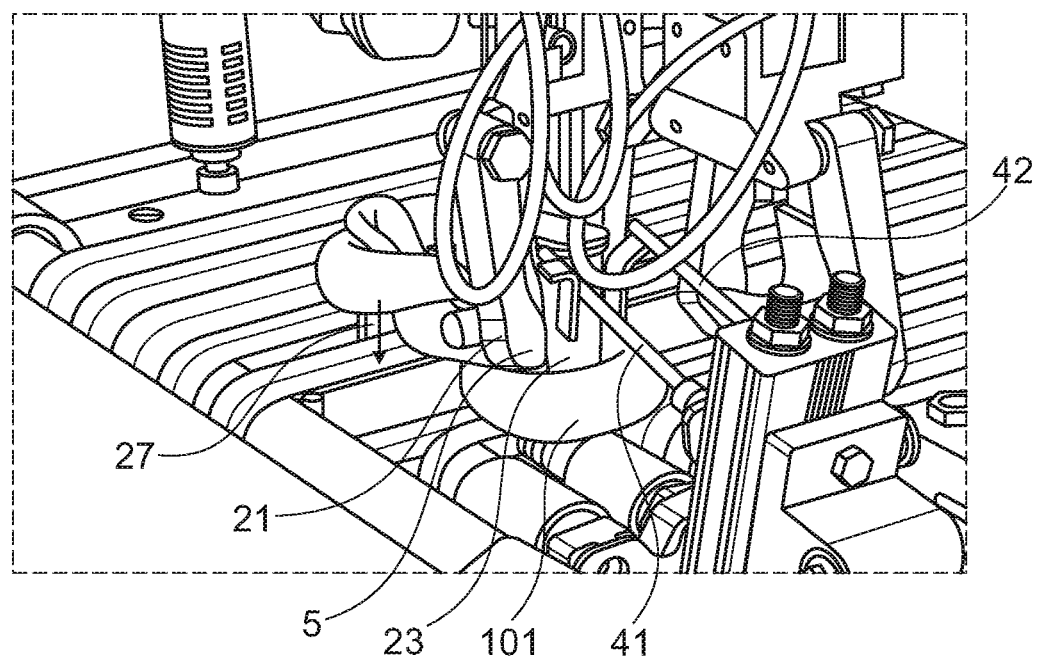
Figure 29:
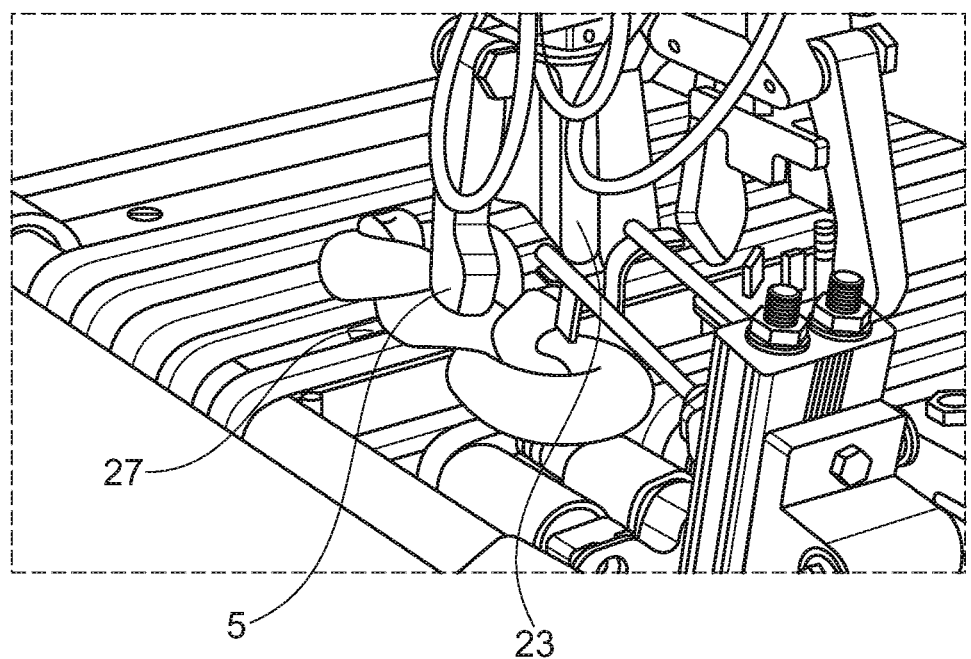

FIG. 12 also shows that on the processing table 3, the U-shaped, positioning means 27 is provided for securing the end of the dough strand 62 during dough processing, wherein said positioning means 27 is capable of retracting into the processing table, as illustrated in FIG. 28 and/or FIG. 29.

Figure 14:
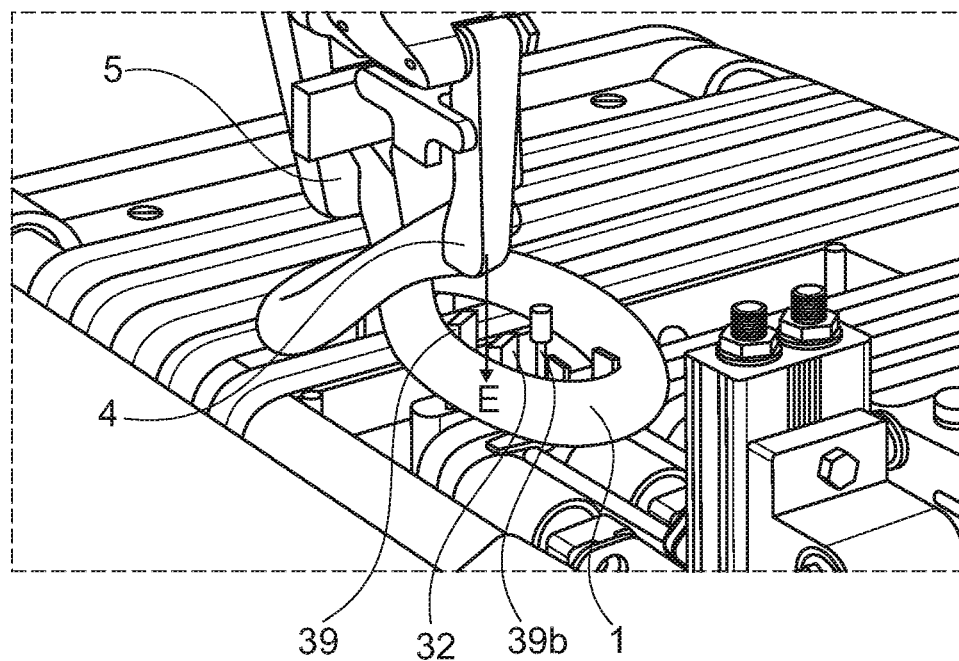
Figure 15:
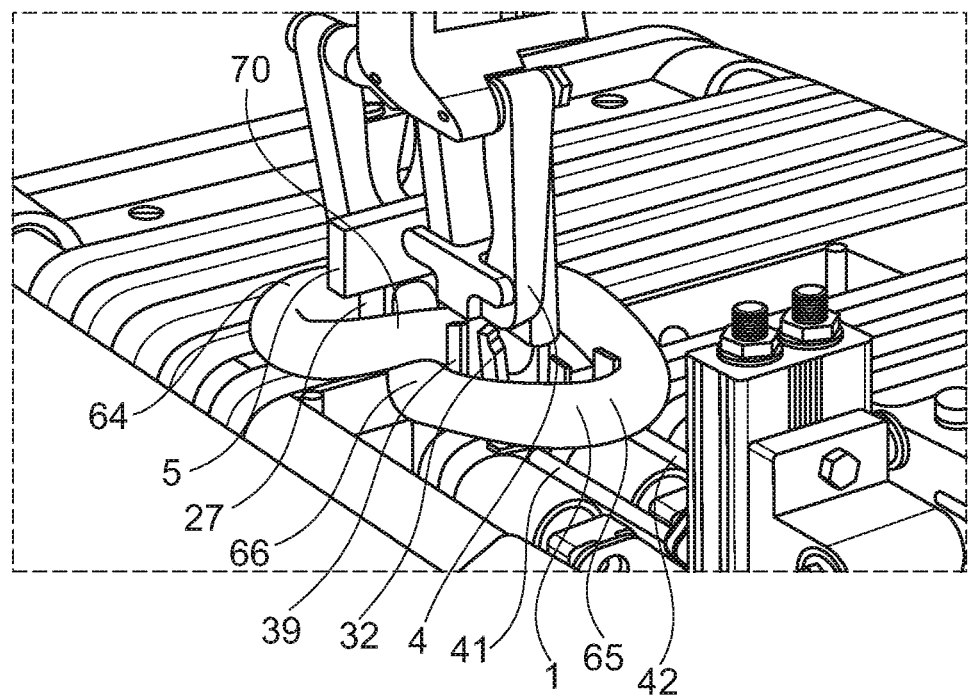

A backward movement of the two grippers 4, 5, as shown in FIG. 14 and as indicated by the arrow D in FIG. 13, and a vertical movement of the grippers 4, 5, as shown in FIG. 15 and indicated in FIG. 14 by the arrow E, result in a pretzel-like basic form of the dough strand 1. The vertical movement of the grippers 4, 5 is achieved by a vertical movement of the processing head 2 via a drive.

In this basic form, the dough strand 1 has a first loop 64, which is close to the retaining tongue 27, and a second loop 65, which is close to the retaining arms. The second loop is held in shape by holding pins 39, 39*b*, 50 and 51, as is clear from FIGS. 14 and 15.

The 90° pivoting movement is important for the second gripper 5, so that the end of the dough strand 62 (cf., FIGS. 11 and 15) can be rotated from a position lying in the direction of conveyance to a transverse position, so that this end 62 can be placed in the retaining tongue 27, specifically in the U-shaped cut-out (FIG. 15). During placement in the retaining tongue, the end of the dough strand 62 can be placed on the dough strand in the area of the loop 64, and can be pressed and secured onto the dough strand by means of the sliding element 23 in the gripper 5. For this purpose, the end 62 is rotated 90°. However, this gripper movement is also important because it allows the first end 61 to be rotated 180°, thereby allowing said end to be placed in the correct position in the table gripper 32 by the first gripper 4, as shown in FIG. 15. Whereas in FIG. 14 the table gripper 32 is still open, in FIG. 15, said table gripper with its gripping fingers 34, 35 (FIG. 6) is closed.

Figure 16:
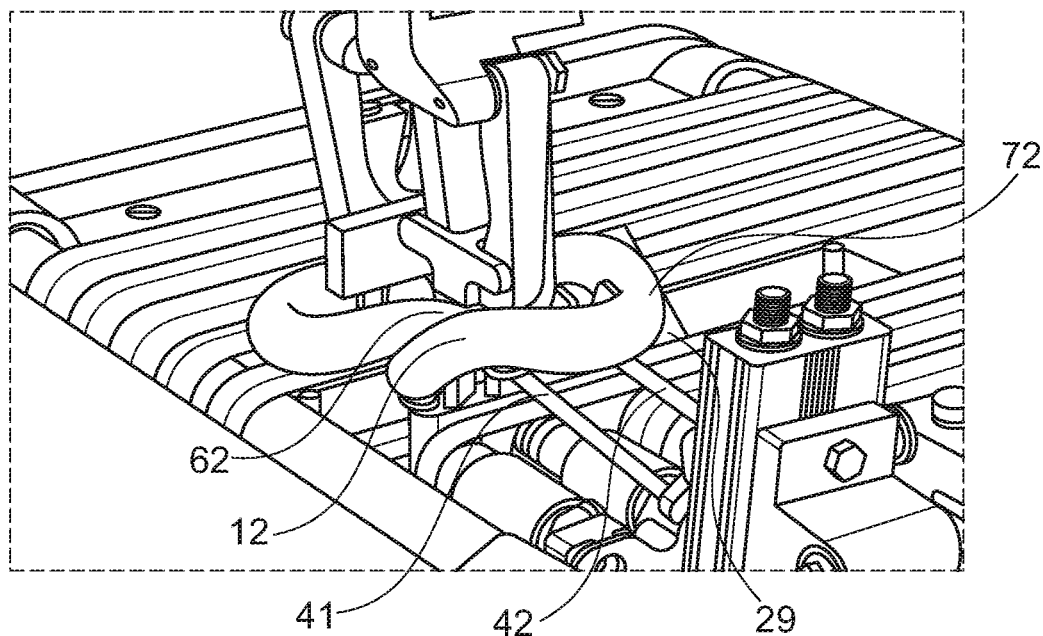
Figure 17:
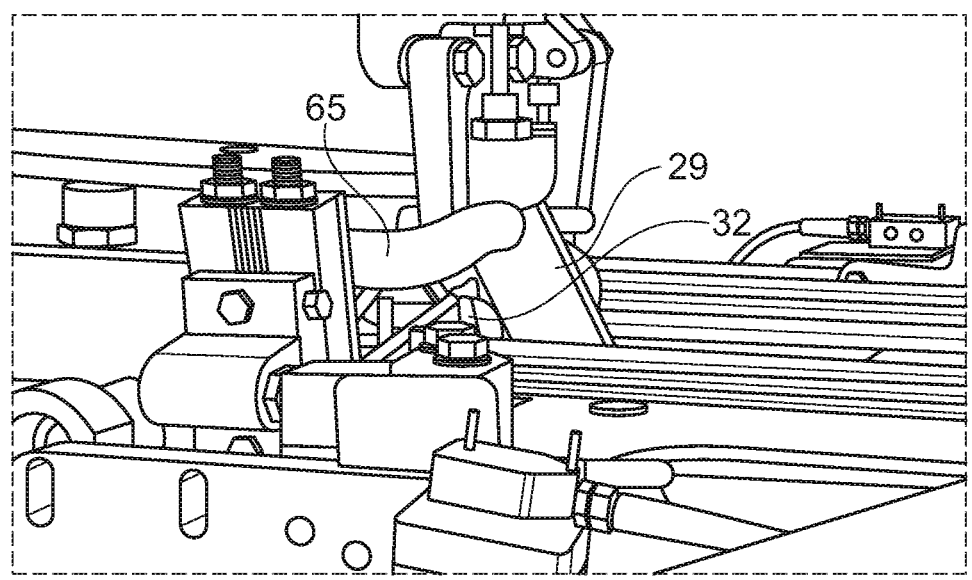
Figure 18:
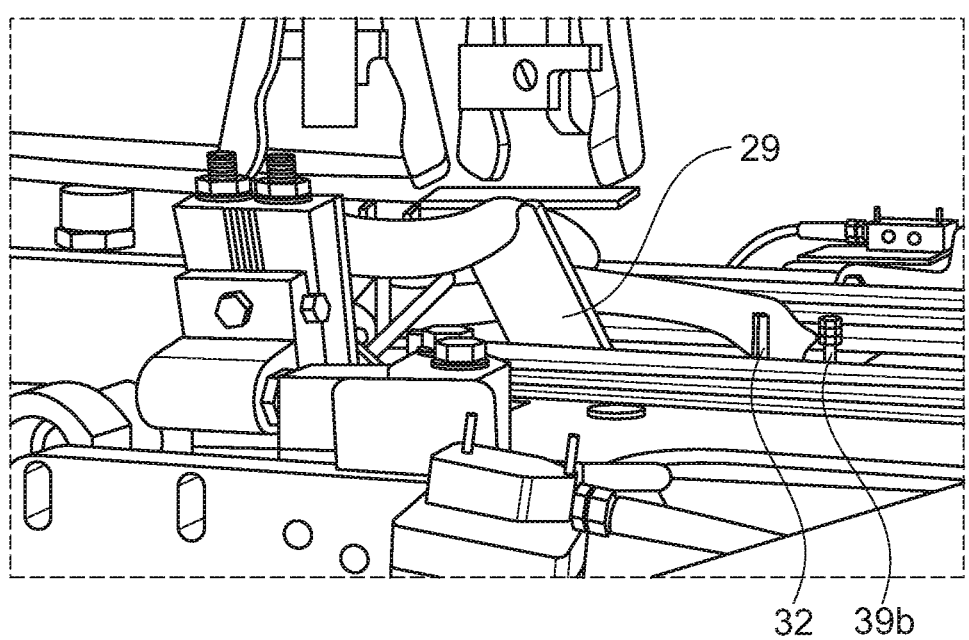

FIGS. 16 and 17 illustrate a lifting process, in which the second loop 65 is raised by means of the holding bar 29 and the retaining arms 41, 42. As is clear from FIG. 17, the loop 65 is raised in the area of the table gripper 32 far enough to allow the first end 61 to be pulled, without impediment, in the direction of arrow K by the table gripper 32, as shown in FIG. 18. In this step, the first holding pin 39 prevents a section of the dough 66 that lies underneath (cf., FIG. 15) from being pulled along by pulling of the table gripper.

Thus FIGS. 16 and 17 illustrate that the positioning means 29, and 41, 42 and/or 40 are embodied as lifting means for lifting the dough strand section 72 to a raised position, so that sections of the dough strand 1 are raised relative to the shaping table or processing table 3.

The second holding pin 39*b* is connected to the linearly displaced grippers and is also linearly displaceable, as is clear from FIG. 18. As a result, the second pin 39*b* does not need to retract into the table 3, because said pin, like the table gripper 32, lies downstream of the single-strand braid when the finished dough product is further transported. FIG. 18 also shows that the positioning means 33 is embodied as a gripping means for pulling one end of the dough strand, so that sections of the dough strand are stretched and/or pulled.

Thus FIG. 18 shows that here only one positioning means is embodied as a holding pin 39*b*, which is not capable of retracting into the processing table 3. Alternatively, in place of the pin 39*b*, a pin that is capable of retracting into the table could also be provided.

Figure 19:
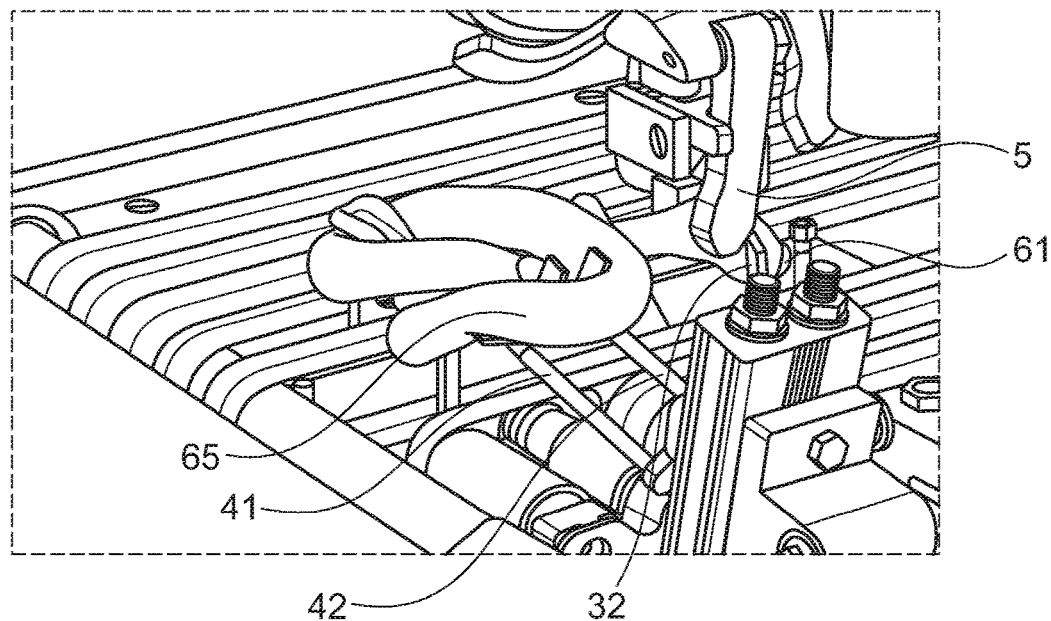

FIG. 19 shows that the second gripper 4 5 grips the first end of dough strand 61 while the end 61 is still held by the table gripper 32. At the same time, the holding bar 29 and the retaining arms 41, 42 hold the second loop 65 in the upper position. In this position, the holding arms 41, 42 are tilted upward.

Figure 20:
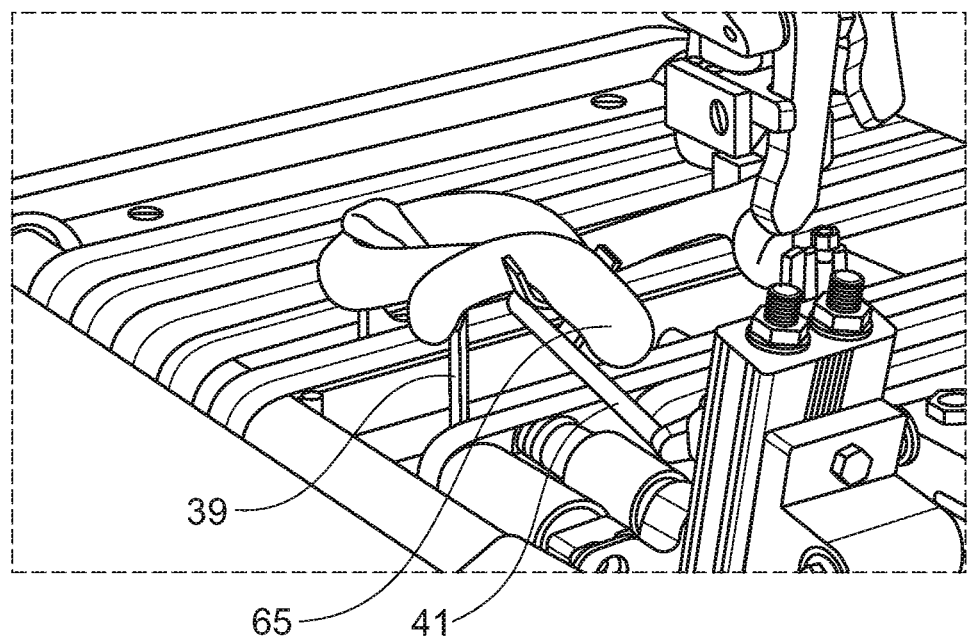

FIG. 20 illustrates both an opening movement of the table gripper 42 and a pivoting movement or a rotation of the second loop 65. Said loop 65 is rotated by rotating the retaining arms around the axis B, initially mentioned (FIG. 6). In this illustration, the arms 41, 42 have rotated approximately 45°. With the L-shaped tongues 51, 52 secured to the free ends of the arms 41, 42, the horizontal legs of which are aligned in opposite directions, the loop rests securely in the arms 41, 42. In this position, the table gripper 32 is already opened. Preferably, the table gripper 32 opens approximately at the start of the pivoting movement of the arms 41, 42. In FIG. 20, the holding pin 39 is still visible. However, this pin must be retracted to enable further conveyance of the dough product. The holding pin 39 is retracted between the position shown in FIG. 20 and that of FIG. 21. The holding bar 29 is already retracted into the table prior to rotation of the loop 65.

Figure 21:
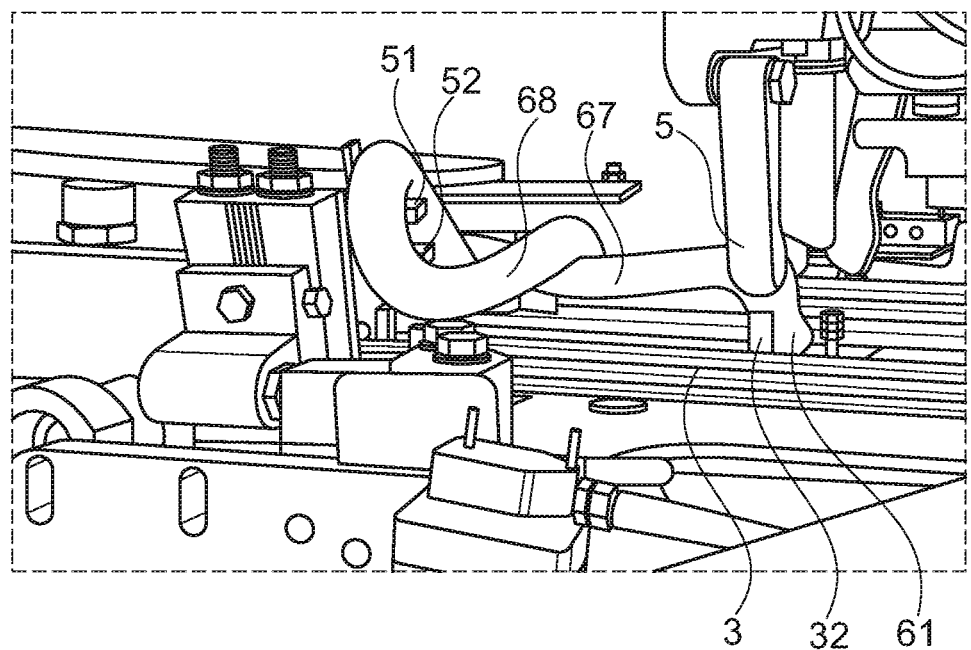

FIG. 21 further shows a rotation of the second loop 65 by nearly 90°. It is also clear that the section of dough 67 between the dough basic form 68 and the gripper 5 is at a distance from the processing table 3.

Figure 22:
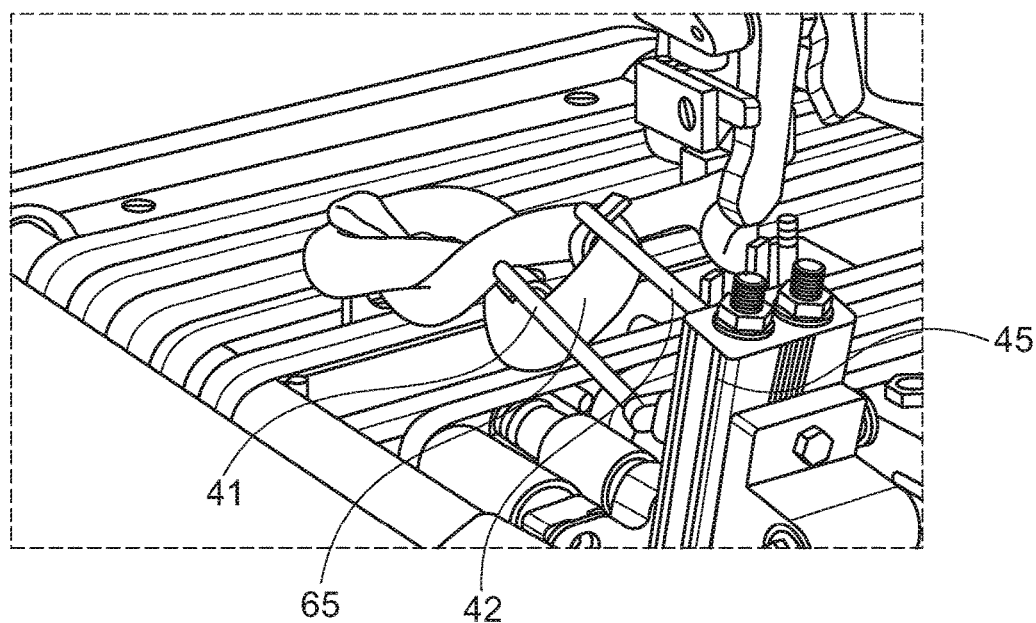

FIG. 22 shows a further rotation of the second loop 65, wherein the angle of rotation is approximately 135°. In this case, the arms 41, 42 are still tilted upward, as is clear from the position of the tilting element 45.

Figure 23:
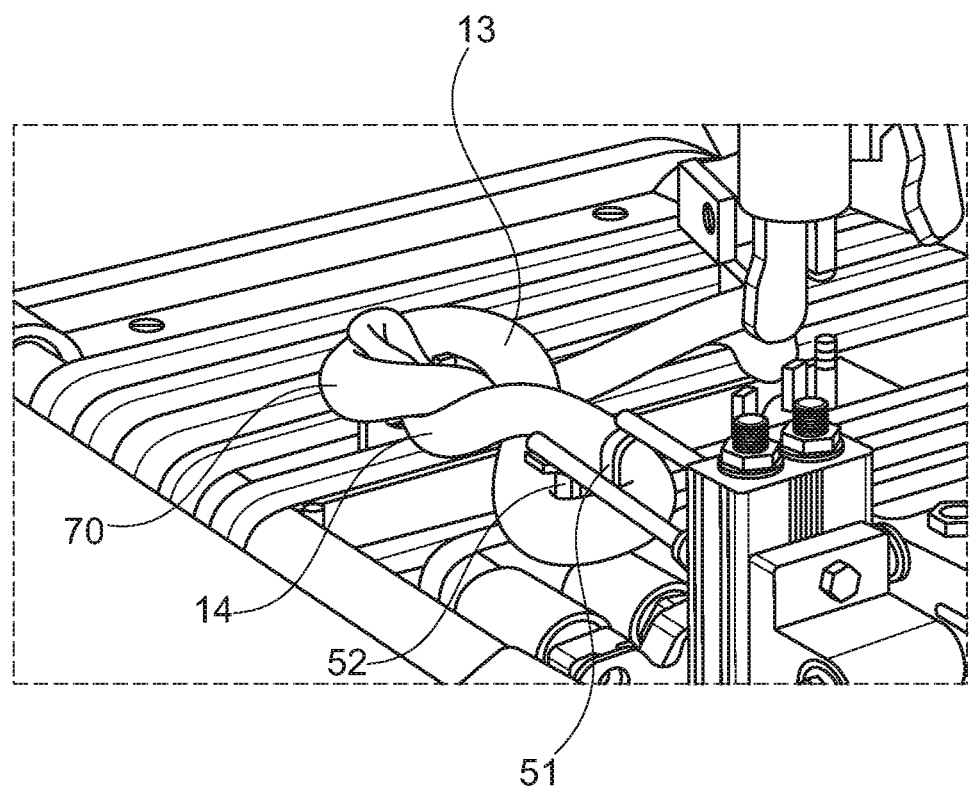

In FIG. 23, the pivoting movement has reached an angle of 180°, wherein the arms 41, 42 have been tilted downward. Here, the formation of the typical loop is clear. As a result, the section that is held by the L-shaped tongues 51, 52 is able to drop downward. The vertical legs of the L-shaped tongues 51, 52 point downward. At these points, dough intersection points 13, 14 and 70 that are similar to the braid according to FIG. 2 are produced.

FIGS. 19 to 23 therefore show that positioning means 40 (retaining arms 41, 42) is embodied as pivoting means for pivoting a dough strand loop 65, which has been shaped by the gripping means 4, 5 of the processing head 2, around an axis of rotation that extends parallel to the plane of the processing table 3.

Figure 24:
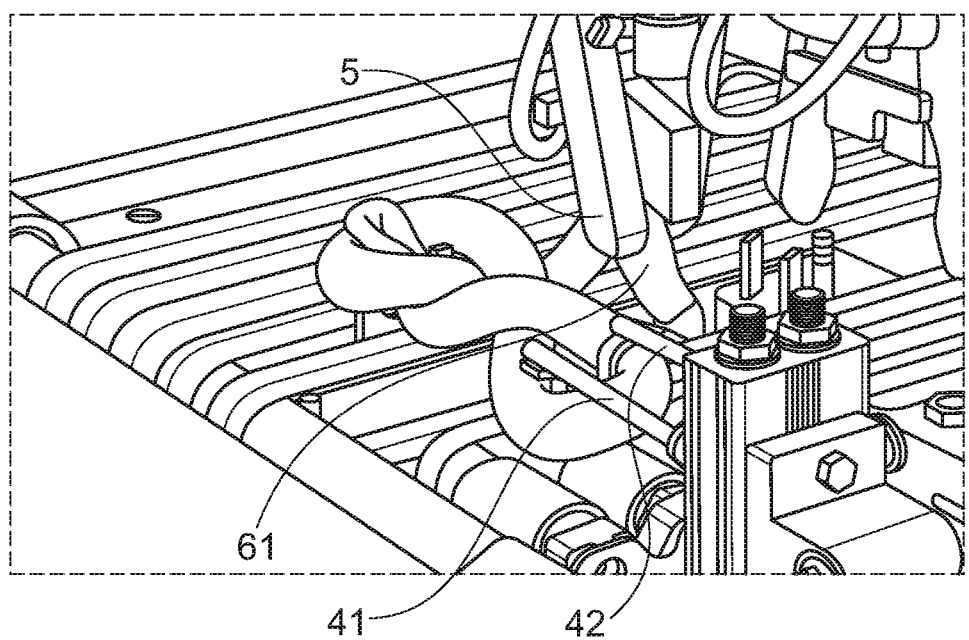
Figure 25:
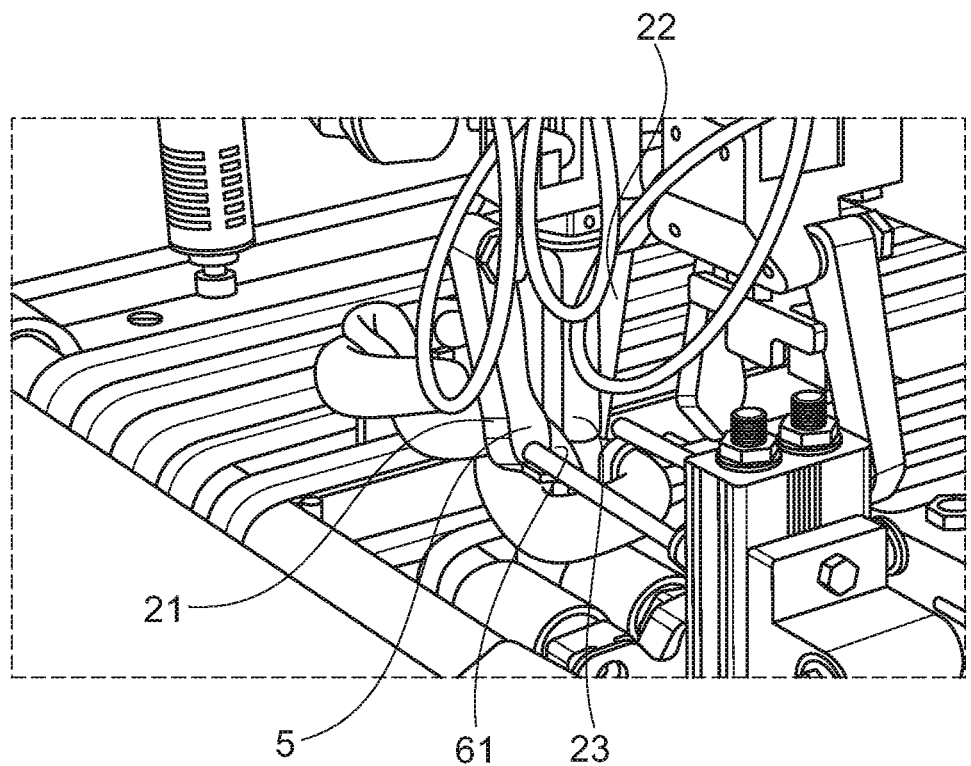
Figure 26:
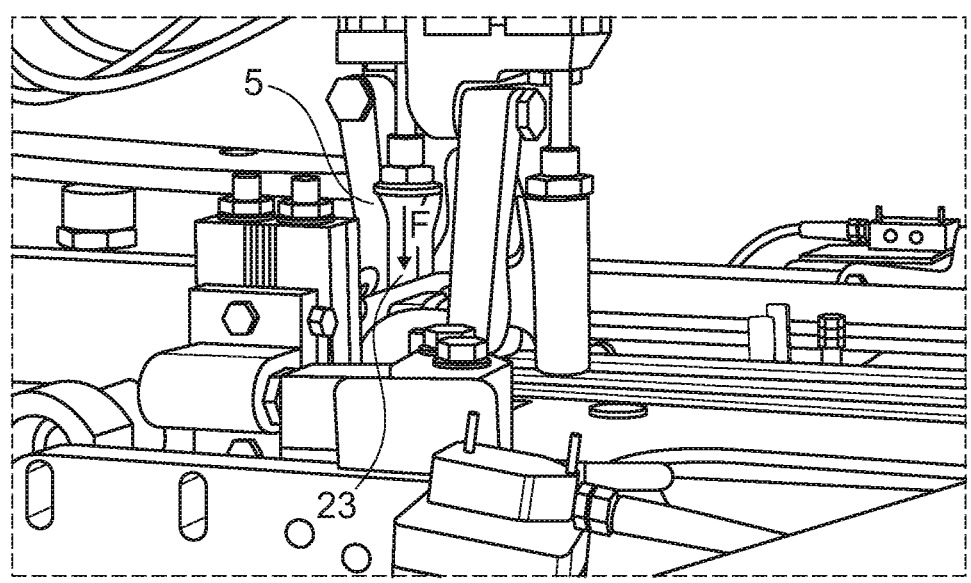

The first end 61 is then moved forward by the gripper 5, i.e., in the direction of the arms 41, 42, as shown in FIG. 24, until the first end 61 lies above the second loop 65 or between the arms 41, 42, as shown in FIG. 25. At the same time, the gripper arm 5 is lowered. To push the end into or through the area of the loop, the sliding element 23 of the gripper 5 is then lowered, as shown in FIG. 26 and indicated by the arrow F. As a result, the sliding element 23 is able to retract into the area of the loop and pass at least partially through the loop opening. In this connection, it should also be mentioned that the sliding element 23 of the second gripper 4 is also moved downward, in order to press the second end 62, once it has been placed in the to retaining tongue 27, onto the first loop 64, which occurs in approximately the time period shown in FIG. 15. The slider 23 is actuated approximately simultaneously with the spreading movement of the gripping fingers 21, 22 (FIG. 4, FIG. 25).

Figure 27:
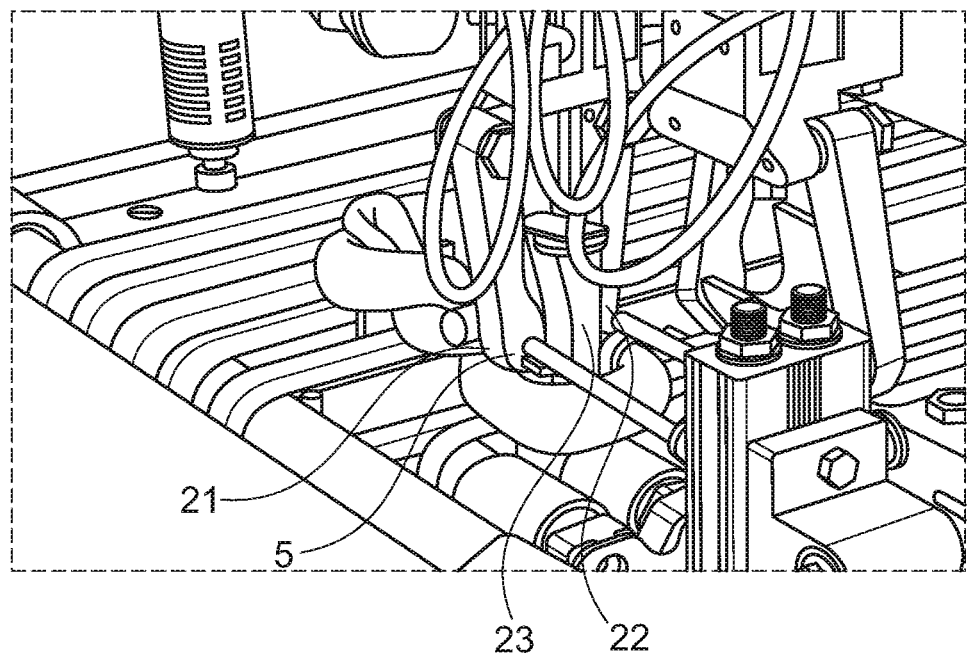

The movement of the sliding element 23 of the second gripper 5 is also illustrated in FIG. 27. In this illustration, however, it is also clear that the retaining arms 41, 42 are tilted downward, whereas in FIG. 28 they are tilted upward in order to release the dough strand 1, wherein the finished dough product is clearly visible there. In this case, the gripper 5 remains in position directly above and resting on the loop, thereby securing the dough strand in a vertical direction on the processing table and preventing the loop from becoming separated when the L-shaped tongues 51, 52 are pulled out.

Next, the gripper 5 is raised, together with its sliding element 23, as shown in FIG. 29. This readies the finished single-strand braid for transport by means of conveyor belts 6 to 8. A comparison of FIGS. 28 and 29 shows that, during the period between the two positions shown, the retaining tongue 27 retracts (cf., the arrow in FIG. 28) to allow further conveyance of the dough product.

Figure 30:
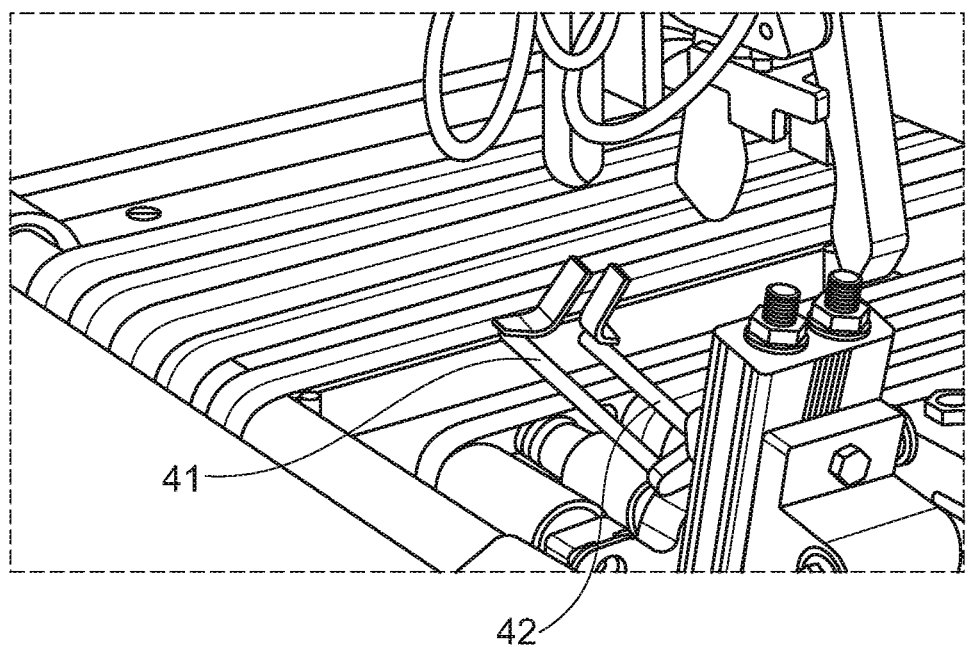
Figure 31:
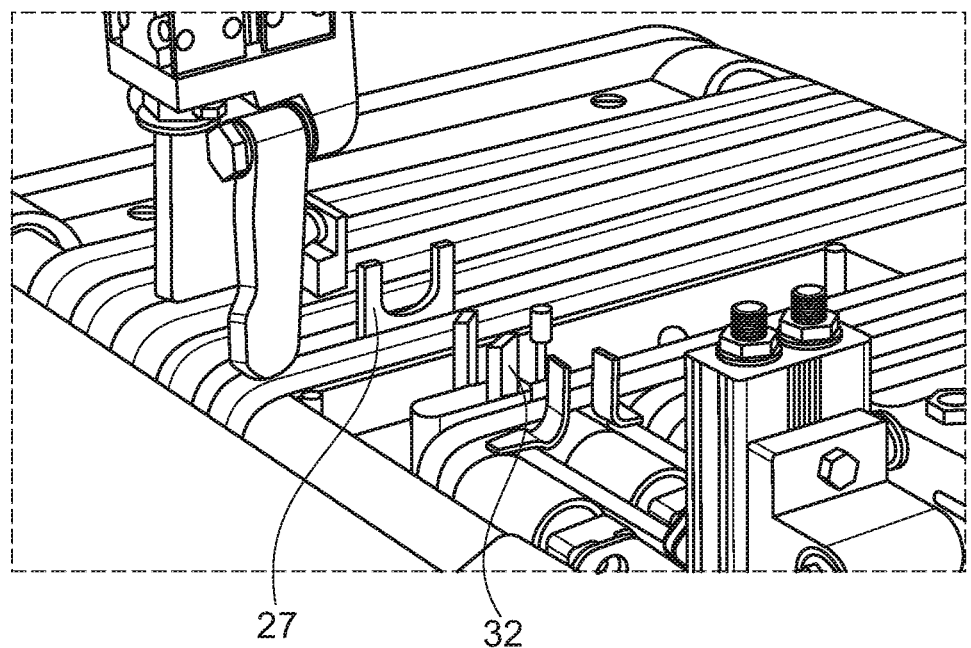

In FIG. 30, the single-strand braid has been advanced further, wherein elements 41, 42, 27 and 32 are then in their normal position, which is illustrated in FIG. 31.

In FIG. 30, the retaining tongue 27 has retracted, and in FIG. 31 it has resurfaced. The table gripper 32 is also moved to its normal position, near the arms 41, 42 (FIG. 31). The arms 41, 42 are in their normal position approximately in the plane of the table, wherein the legs of the L-shaped retaining tongues 51, 52 point upward.

The described production method comprises the following steps:

A dough strand infeed step, in which the U-shaped dough strand 1 is fed to the processing table 3, as illustrated in FIGS. 9 and 10.

A processing step as illustrated in FIGS. 11 to 15, in which an approximately pretzel-shaped basic form (FIG. 15) is formed from the U-shaped dough to strand 1 through a crossover dough movement by means of the grippers 4, 5 with the first loop 64 and the second loop 65, wherein the dough strand is not looped or knotted at the intersection point 70 (cf., FIG. 3*b*).

A first securing step, as illustrated in FIG. 15 or 16, in which the second end 62 of the dough strand 1 is secured on the processing table 3 and/or on the dough loop 64, specifically by means of the U-shaped positioning means 27 or the gripper 5.

A second securing step, in which the strand section 1 is secured on the processing table 3 in the area of the second loop 65, which is opposite the first end 61, specifically by the holding pin 39 and the pin 39*b*, but also by the retaining arms 41, 42 or the L-shaped retaining tongues 51, 52, as shown in FIG. 15.

A lifting step, in which the strand section 1 in the area of the second loop 65 is raised, as illustrated in FIGS. 16 to 18. This step is carried out at least by the lifting means 41, 42 and by the linearly guided lifting element 29.

A gripping step, as illustrated by FIGS. 17 to 19, in which the first end is gripped by the gripping means 32 or 33 arranged on the processing table 3, and is pulled between the processing table 3 and the area of the strand section 72 (FIG. 16).

A further gripping step, in which the first end 61 is gripped by the gripping means 5 arranged on the processing head 3, as illustrated in FIGS. 19 and 20.

A pivoting step by means of the arms 41, 42, in which the second loop 65 is pivoted approximately 180° about an axis, which is aligned transversely to the direction of conveyance along the processing table, to the raised position, wherein the dough is then crossed over at two locations, as shown in FIGS. 20 to 23.

A dough movement step, in which the second loop 65 is placed back on the processing table 3, as illustrated by FIGS. 22 and 23. This step is implemented by tilting the retaining arms 41, 42.

A further dough movement step, in which the first dough end 61 is placed in the second loop 65, as shown in FIGS. 22 to 27. This step is implemented by the gripper 5.

The sequence of movements of the processing means 27, 29, 32, 39, 39b, 41 and 42 of the processing table is controlled by MPC, which also controls the processing head 2. It is also possible to use sensors, with which the positions and movements of the dough strand 1 on the processing table 3 can be detected. The sequence of movements of processing means 27, 29, 32, 39, 39b, 41 and 42 can be controlled pneumatically (e.g., by means of valves) and/or electrically.

The invention is not limited to this example, and thus, as an alternative to the two retaining arms 41, 42, another holding element can also be used, which has a recess at its unattached end, for example, allowing the end of the dough strand to be secured. In place of the L-shaped tongues, pins or other bars could also be used. The gripper arms of the table gripper 32 could also be pointed forward rather than being aligned upward, so that the gripper arms pivot perpendicular to the plane of the table. A plurality of table grippers may also be used. The number of holding pins also is not limited to two. For instance, three or more pins could be provided on the table. Alternatively to the U-shaped positioning means, two pins lying side by side or other securing elements could be used.

Figure 32:
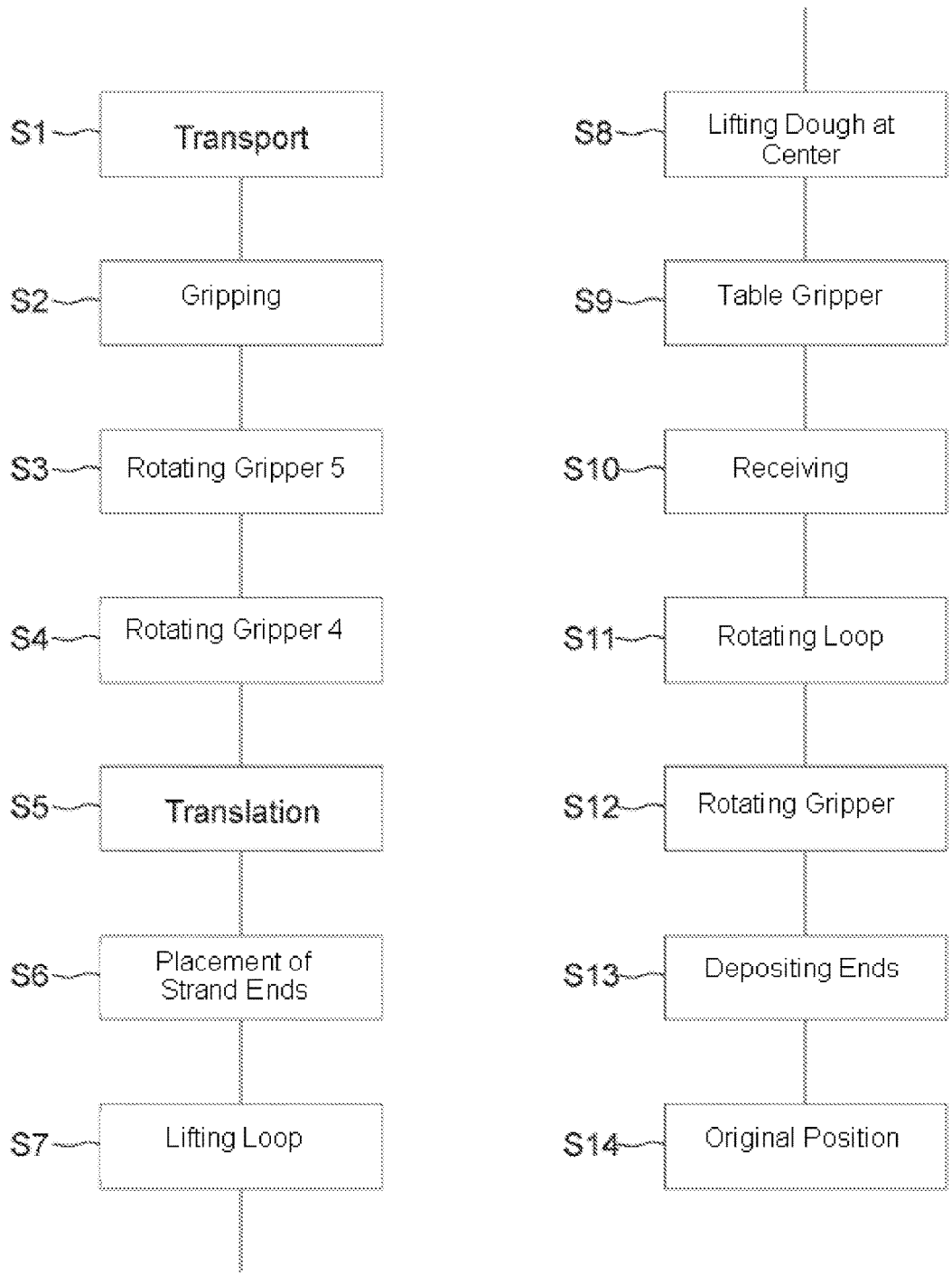
FIG. 32 a flow chart illustrating the process.

FIG. 32 shows a flow chart for the process according to the invention, including al process steps. The dough strand 1 is transported in a U-shape to the processing area, wherein it is stopped and secured by the holding pins 39 B and the legs of the retaining tongues 27, 51, and 52. In the next step S2, the grippers 4 and 5 grip the ends of the dough strand 61 and 62. Gripper 5 then rotates 90°, wherein the end of the dough strand 62 continues to be held by gripper 5. This is followed by a 180° rotation of the gripper 4 with the end of the dough strand 61 around the gripper 5 (step S4). Upon completion of the rotational movement of the gripper 4, grippers 4 and 5 are moved together opposite the direction of conveyance of the U-shaped dough strand 1 (step S5), to allow the dough strand ends 61 and 62 to be deposited later. In this step, gripper 4 places dough strand end 61 in the table gripper 32 and gripper 5 places dough strand end 62 in the retaining tongue 27 (step S6).

To allow dough strand end 61 to be pulled through the loop 12, in step S6 during placement of the dough strand ends 61 and 62, the loop 12 is raised by the retaining tongues 51 and 52 of the rotary actuator 63 via a tilting movement of the rotary actuator 63 (step S7).

The section of the strand 11 with the holding bar 29 is then raised (step S8), after which the table gripper 32 pulls dough strand end 61 through the loop 12 (step S9).

Grippers 4 and 5 are then moved in such a way that gripper 5 is able to receive dough strand end 61 in the next step S10. The loop 12 is then rotated 180° clockwise by a rotating movement of the retaining tongues 51 and 52 and is then deposited again (step S11). In the next step S12, gripper 5 is rotated 90° clockwise with dough strand end 61, after which dough strand end 61 is placed in the loop 12 (step S13).

Grippers 4 and 5, holding bar 29, retaining tongues 51 and 52, the rotary actuator and all other parts of the apparatus that are used are then moved back to their normal positions, in order to process the next dough strand 1 (step S14).

LIST OF REFERENCE SIGNS

100 Dough processing system
1 Dough strand
2 Processing head
3 Processing table
4, 5 Grippers
6 Narrow conveyor belt
7, 8 Wide conveyor belt
9 -
10 -
11 Strand section
12 Loop
13, 14 Intersection points
15 Horizontal guide
16 Lift cylinder
17, 18 Guide elements
19 Vertical guide
20 Rotating head
21, 22 Gripping fingers
23 Sliding element
24, 25 Axes
26 U-shaped positioning means (first positioning means)
27 Retaining tongue
28 Lifting means (second positioning means)
29 Holding bar
30 Curved contour
32 Table gripper
33 Gripping means or positioning means (third means)
34, 35 Gripping fingers
36 Support plate
37 Bolts
38 Positioning means (fourth means)
39 Holding pin
39b Positioning means (fifth means)
40 Positioning means (sixth means)
41, 42 Retaining arms
44 Mount
45 Tilting element
46 Lift cylinder
50 Fork arms
51 Retaining tongue
52 Retaining tongue
53 Leg
61 Dough strand end
62 Dough strand end
63 Rotary actuator
64 Loop
65 Loop 66 Dough section
67 Dough section
68 Basic body
70 Intersection point
71 Intersection point
72 Dough strand section

The invention claimed is:

1. A dough processing system (100) for processing a U-shaped strand of dough (1), and comprising:
- a processing head (2), which has two gripping means (4, 5) adapted for looping the dough strand (1) into a first loop (64) and a second loop (65)
- and a shaping table (3), which is a processing table that is a unit separated from and arranged below said processing head (2) and is equipped with multiple positioning means that have multiple different processing functions, the multiple positioning means including conveyor belts (6, 7, 8) for positioning the dough strand (1), the shaping table further including
  - (a) a lifting means (28) that is a holding bar (29) extending between conveyer belts at an angle from vertical, retractable into the processing table, deployable outward from the processing table and adapted for raising said second loop (65) of dough to a raised position that is raised at least by the height of the dough strand, so that said second loop (65) of dough strand (1) is raised relative to the shaping table (3) allowing one end of the dough strand to be pulled through beneath said second dough loop,
  - (b) a table gripper (32) that is a gripping means (33), arranged between conveyer belts and displaceable in the direction of conveyance (X,K) of said conveyor belts, the table gripper having gripping fingers (32) and adapted for gripping and pulling on a dough strand end (61), so that sections of the dough strand (1) are pulled through beneath said second dough loop (65), and
  - (c) a pivoting means (40) for pivoting said second dough loop (65), shaped by the gripping means (4, 5) of the processing head (2), around an axis of rotation that is arranged parallel to the plane of the shaping table (3).

2. A dough processing system according to claim 1, characterized in that
   the pivoting means (40) has two retaining arms (41, 42) spaced from one another, which are aligned transversely to the direction of conveyance along the processing table (3), and which support at one of their ends a retaining tongue (51, 52),
   wherein the two retaining arms (41, 42) are capable of rotating around an axis of rotation B, which is aligned transversely to the direction of conveyance of the processing table (3) and spaced from the retaining arms (41, 42),
   and wherein the retaining arms (41, 42) are secured at the ends opposite the retaining tongues (51, 52) to a mount (44), which is connected to a tilting element (45) fastened to the processing table (3) thereby said mount being tiltable around an axis (C) aligned in the direction of conveyance along the processing table (3), resulting in an upward and downward movement of the retaining arms (41, 42) or the retaining tongues (51, 52).

* * * * *